US012482399B2

(12) United States Patent
Kim et al.

(10) Patent No.: US 12,482,399 B2
(45) Date of Patent: Nov. 25, 2025

(54) DRIVING CONTROLLER, DISPLAY DEVICE AND DRIVING METHOD THEREOF

(71) Applicant: Samsung Display Co., LTD., Yongin-si (KR)

(72) Inventors: Jihye Kim, Yongin-si (KR); Sangan Kwon, Yongin-si (KR); Soon-Dong Kim, Yongin-si (KR); Taehoon Kim, Yongin-si (KR); Geunjeong Park, Yongin-si (KR); Changnoh Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 99 days.

(21) Appl. No.: 18/585,325

(22) Filed: Feb. 23, 2024

(65) Prior Publication Data

US 2024/0404451 A1 Dec. 5, 2024

(30) Foreign Application Priority Data

May 31, 2023 (KR) ........................ 10-2023-0070045

(51) Int. Cl.
*G09G 3/20* (2006.01)
*G09G 3/00* (2006.01)
*G09G 3/32* (2016.01)

(52) U.S. Cl.
CPC ........... *G09G 3/2092* (2013.01); *G09G 3/035* (2020.08); *G09G 3/32* (2013.01);
(Continued)

(58) Field of Classification Search
CPC ........ G09G 3/2092; G09G 3/035; G09G 3/32; G09G 2300/0819; G09G 2300/0842;
(Continued)

(56) References Cited

U.S. PATENT DOCUMENTS

2021/0118354 A1* 4/2021 Ahn ..................... G09G 3/2051
2022/0139309 A1* 5/2022 Ok ....................... G09G 3/3225
345/214

(Continued)

FOREIGN PATENT DOCUMENTS

CN 116229859 A 6/2023
KR 1020230084400 A 6/2023

*Primary Examiner* — Kenneth B Lee, Jr.
(74) *Attorney, Agent, or Firm* — CANTOR COLBURN LLP

(57) ABSTRACT

A driving controller includes a compensation unit that receives an image signal corresponding to a first display area and a second display area, calculates stress data based on the image signal and previous stress data, and outputs an image data signal, which is obtained by compensating for the image signal based on the stress data, a memory that stores the stress data of a previous frame from the compensation unit and provides the previous stress data, and a multi-frequency compensation unit that receives a data enable signal, counts a number of consecutive masking enable frames when the data enable signal indicates a multi-frequency mode, calculates accumulated second stress data based on the number of the consecutive masking enable frames and second stress data, which corresponds to the second display area, from among the stress data from the memory, and stores the accumulated second stress data in the memory.

20 Claims, 17 Drawing Sheets

(52) U.S. Cl.
CPC ............... *G09G 2300/0819* (2013.01); *G09G 2300/0842* (2013.01); *G09G 2310/08* (2013.01); *G09G 2320/048* (2013.01); *G09G 2320/0686* (2013.01); *G09G 2330/021* (2013.01); *G09G 2340/0435* (2013.01)

(58) Field of Classification Search
CPC ......... G09G 2310/08; G09G 2320/048; G09G 2320/0686; G09G 2330/021; G09G 2340/0435
See application file for complete search history.

(56) References Cited

U.S. PATENT DOCUMENTS

| | | | | |
|---|---|---|---|---|
| 2022/0351659 | A1* | 11/2022 | Kwon .................. | G09G 3/3266 |
| 2023/0178003 | A1 | 6/2023 | Kim et al. | |
| 2023/0402013 | A1* | 12/2023 | Lim ..................... | G09G 3/3266 |

* cited by examiner

DRIVING CONTROLLER, DISPLAY DEVICE AND DRIVING METHOD THEREOF

This application claims priority to Korean Patent Application No. 10-2023-0070045, filed on May 31, 2023, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

A display device typically includes pixels connected to data lines and scan lines. Each of the pixels may include a light emitting element and a pixel circuit for controlling the light emitting element. The pixel circuit may provide a current corresponding to a data signal to the light emitting element. At this time, light having predetermined luminance may be generated in response to a current flowing via the light emitting element.

The characteristic of each of the pixels may be changed depending on an operating environment.

SUMMARY

Embodiments of the disclosure provide a display device with reduced power consumption, and a driving method thereof.

Embodiments of the disclosure provide a display device capable of compensating for changes in characteristics of pixels, and a driving method thereof.

According to an embodiment, a display device includes a display panel including a first display area and a second display area, and a driving controller which receives an image signal and a control signal, outputs an image data signal to corresponding to an image to be displayed by the display panel, and drives the first display area at a first operating frequency and drive the second display area at a second operating frequency different from the first operating frequency when the control signal indicates a multi-frequency mode. In such an embodiment, the multi-frequency mode includes full driving frames and masking enable frames, the driving controller includes a compensation unit which calculates stress data based on the image signal and previous stress data, and outputs the image data signal, which is obtained by compensating for stress for the image signal based on the stress data, a memory which stores the stress data of a previous frame from the compensation unit as the previous stress data and provides the previous stress data to the compensation unit, and a multi-frequency compensation unit which counts a number of consecutive masking enable frames in the multi-frequency mode, calculates accumulated second stress data based on the number of the consecutive masking enable frames and second stress data, wherein the second stress data corresponds to the second display area, from among the previous stress data from the memory, and stores the accumulated second stress data in the memory.

In an embodiment, first stress data corresponding to the first display area and the accumulated second stress data corresponding to the second display area among the stress data previously stored in the memory may be provided to the compensation unit as the previous stress data.

In an embodiment, the accumulated second stress data may be obtained by multiplying the second stress data and the number of the consecutive masking enable frames.

In an embodiment, the control signal may include a data enable signal. The multi-frequency compensation unit may determine whether a current frame corresponds to one of the full driving frames and the masking enable frames, based on a count signal obtained by counting a number of times that the data enable signal transitions to an active level during the current frame.

In an embodiment, when the count signal is less than a reference value, the multi-frequency compensation unit may determine that the current frame is one of the masking enable frames.

In an embodiment, the reference value may be equal to a number of all horizontal lines of the display panel.

In an embodiment, the data enable signal may transition to an active level when a valid image signal thus corresponding to a respective horizontal line is received.

In an embodiment, the second operating frequency is a frequency lower than the first operating frequency.

In an embodiment, in the multi-frequency mode, the multi-frequency compensation unit may count the number of the consecutive masking enable frames, may receive first stress data corresponding to the first display area and second stress data corresponding to the second display area from the memory among the stress data from the compensation unit, may calculate the accumulated second stress data based on the number of the consecutive masking enable frames, and may store merged stress data, which is obtained by merging the first stress data and the accumulated second stress data, in the memory.

In an embodiment, the merged stress data stored in the memory may be provided to the compensation unit as the previous stress data during a next frame.

According to an embodiment, a driving controller includes a compensation unit which receives an image signal corresponding to a first display area and a second display area, calculates stress data based on the image signal and previous stress data, and outputs an image data signal, which is obtained by compensating for the image signal based on the stress data, a memory which stores the stress data of a previous frame from the compensation unit as the previous stress data and provides the previous stress data to the compensation unit, and a multi-frequency compensation unit which receives a data enable signal, counts a number of consecutive masking enable frames when the data enable signal indicates a multi-frequency mode, calculates accumulated second stress data based on the number of the consecutive masking enable frames and second stress data, which corresponds to the second display area, from among the stress data from the memory, and stores the accumulated second stress data in the memory. In such an embodiment, the multi-frequency mode includes full driving frames and the masking enable frames. In such an embodiment, the multi-frequency compensation unit determines whether a current frame corresponds to one of the full driving frames and the masking enable frames, based on the data enable signal. In such an embodiment, in the multi-frequency mode, the first display area is driven at a first operating frequency, and the second display area is driven at a second operating frequency different from the first operating frequency.

In an embodiment, first stress data corresponding to the first display area and the accumulated second stress data corresponding to the second display area among the stress data previously stored in the memory may be provided to the compensation unit as the previous stress data.

In an embodiment, the accumulated second stress data may be obtained by multiplying the second stress data and the number of the consecutive masking enable frames.

In an embodiment, the multi-frequency compensation unit may determine whether the current frame corresponds to one of the full driving frames and the masking enable frames, based on a count signal obtained by counting a number of times that the data enable signal transitions to an active level during the current frame.

In an embodiment, when the count signal is less than a reference value, the multi-frequency compensation unit may determine that the current frame is one of the masking enable frames.

In an embodiment, the second operating frequency is a frequency lower than the first operating frequency.

In an embodiment, in the multi-frequency mode, the multi-frequency compensation unit may count the number of the consecutive masking enable frames, may receive first stress data corresponding to the first display area and second stress data corresponding to the second display area from the memory among the stress data from the compensation unit, may calculate the accumulated second stress data based on the number of the consecutive masking enable frames, and may store merged stress data, which is obtained by merging the first stress data and the accumulated second stress data, in the memory.

In an embodiment, the merged stress data stored in the memory may be provided to the compensation unit as the previous stress data during a next frame.

According to an embodiment, a driving method of a display device includes receiving an image signal corresponding to a first display area and a second display area and receiving previous stress data from a memory, calculating stress data based on the image signal and the previous stress data and compensating for the image signal based on the stress data, outputting an image data signal obtained by compensating for the image signal based on the stress data, and storing the stress data in the memory, receiving a control signal and determining whether a current frame is a masking enable frame of a multi-frequency mode, based on the control signal, counting a number of consecutive masking enable frames when the current frame is the masking enable frame of the multi-frequency mode, and calculating accumulated second stress data based on the number of the consecutive masking enable frames and second stress data corresponding to the second display area among the stress data stored in the memory and storing the accumulated second stress data in the memory.

In an embodiment, the receiving of the previous stress data from the memory may include receiving first stress data corresponding to the first display area and the accumulated second stress data corresponding to the second display area among the stress data previously stored in the memory as the previous stress data.

In an embodiment, the accumulated second stress data may be obtained by multiplying the second stress data and the number of the consecutive masking enable frames.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
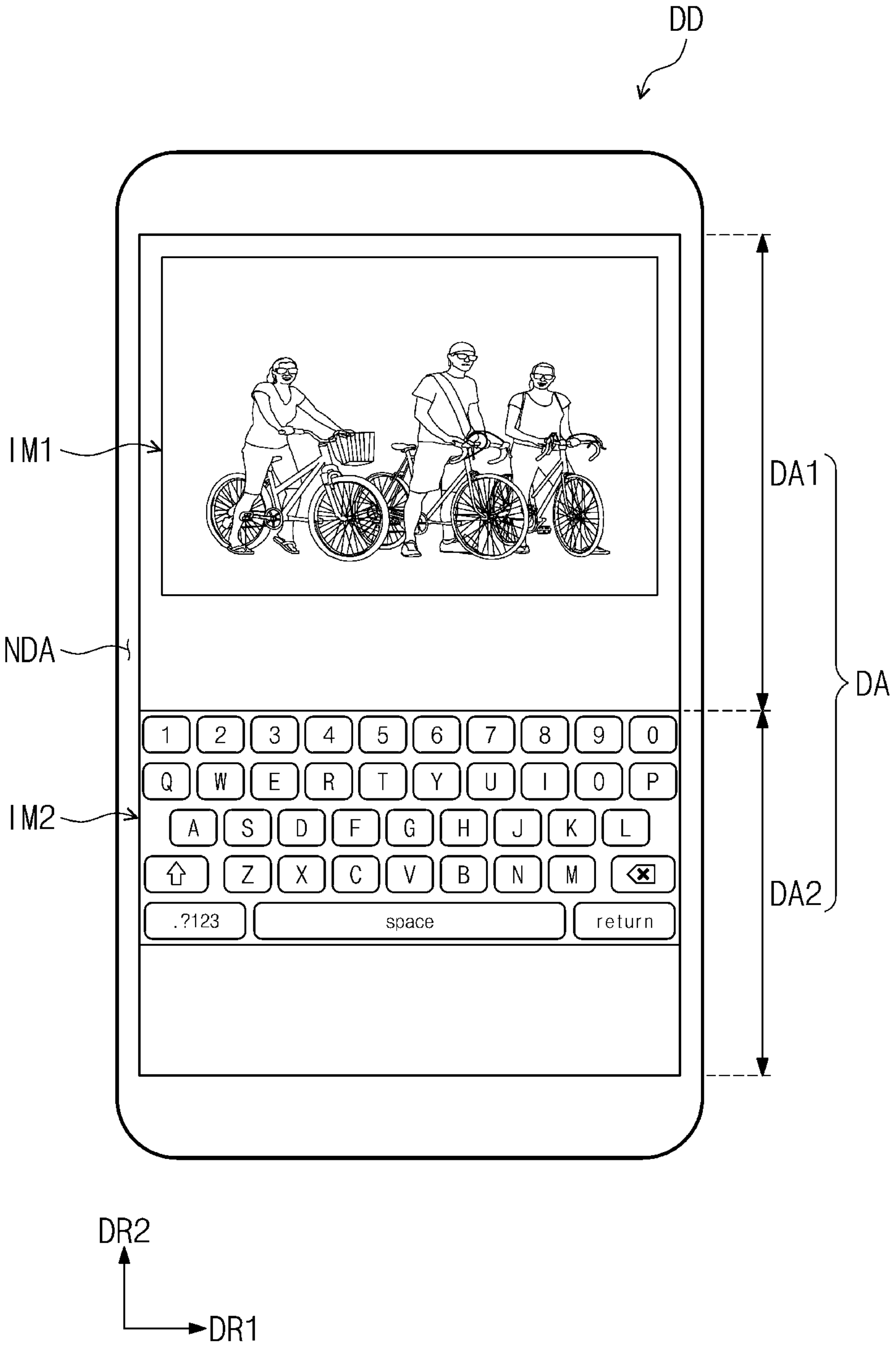
FIG. 1 illustrates a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component.

Also, the terms "under", "beneath", "on", "above", etc. are used to describe a relationship between components illustrated in a drawing. The terms are relative and are described with reference to a direction indicated in the drawing.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in this specification have the same meaning as commonly understood by those skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to accompanying drawings.

FIG. 1 illustrates a display device, according to an embodiment of the disclosure.

Referring to FIG. 1, an embodiment where a display device DD is a portable terminal is illustrated as an example. The portable terminal may include a tablet personal computer (PC), a smartphone, a personal digital assistant (PDA), a portable multimedia player (PMP), a game console, a wristwatch-type electronic device, or the like. However, the disclosure is not limited thereto. The disclosure may be used for small and medium electronic devices such as a personal computer, a notebook computer, a kiosk, a car navigation unit, and a camera, in addition to large-sized electronic equipment such as a television or an outside billboard. The above examples are provided only as an embodiment, and it is obvious that the display device DD may be applied to any other electronic device(s) without departing from the concept of the disclosure.

In an embodiment, as shown in FIG. 1, a display surface, on which a first image IM1 and a second image IM2 are displayed, is parallel to a plane defined by a first direction DR1 and a second direction DR2. The display device DD includes a plurality of areas separated on the display surface. The display surface includes a display area DA, in which the first image IM1 and the second image IM2 are displayed, and a non-display area NDA adjacent to the display area DA. The non-display area NDA may be referred to as a bezel area. In an embodiment, for example, the display area DA may have a rectangular shape. The non-display area NDA surrounds the display area DA. In an embodiment, although not illustrated, for example, the display device DD may include a shape thus partially curved.

The display area DA of the display device DD includes a first display area DA1 and a second display area DA2. In a specific application program, the first image IM1 may be displayed on the first display area DA1, and the second image IM2 may be displayed on the second display area DA2. In an embodiment, for example, the first image IM1 may be an image having a fast change cycle (e.g., video), and the second image IM2 may be an image (e.g., a still image such as a photo or text information) having a long change period.

The operating mode of the display device DD may include a normal mode and a multi-frequency mode. In the normal mode, the display device DD may drive both the first display area DA1 and the second display area DA2 at a normal frequency. In the multi-frequency mode, the display device DD according to an embodiment may drive the first display area DA1 where the first image IM1 is displayed at a first operating frequency, and may drive the second display area DA2 where the second image IM2 is displayed, at a second operating frequency. In an embodiment, the first operating frequency may be higher than or equal to a normal frequency. In an embodiment, the second operating frequency may be lower than the first frequency. In such an embodiment, the display device DD may reduce power consumption by lowering the operating frequency of the second display area DA2.

The size of each of the first display area DA1 and the second display area DA2 may be a preset size, and may be changed by an application program.

In an embodiment, when the still image is displayed in the first display area DA1 and the video is displayed in the second display area DA2, the first display area DA1 may be driven at a frequency lower than the normal frequency, and the second display area DA2 may be driven at a frequency higher than or equal to the normal frequency.

In an embodiment, the display area DA may be divided into three or more display areas. An operating frequency of each of the display areas may be determined depending on the type (a still image or video) of an image displayed in each of the display areas.

Figure 2A:
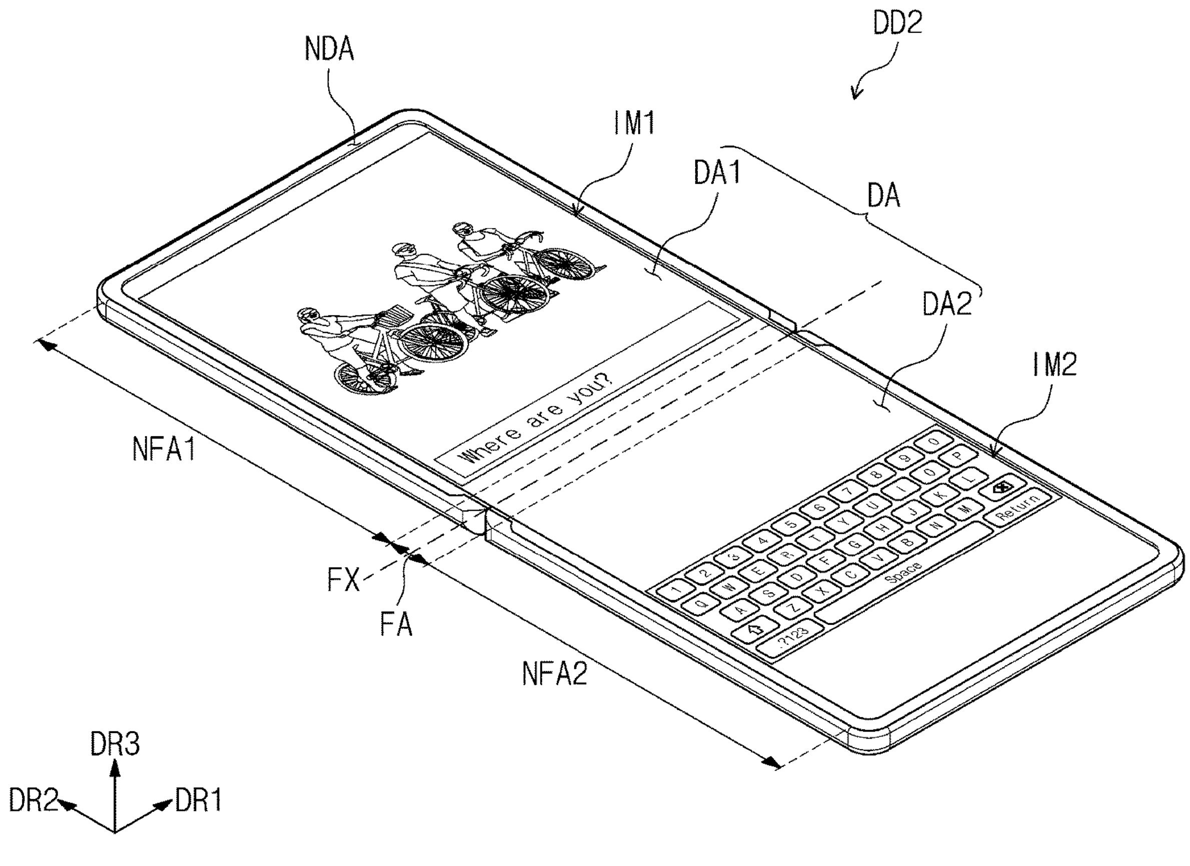
FIGS. 2A and 2B are perspective views of a display device, according to an embodiment of the disclosure.
Figure 2B:
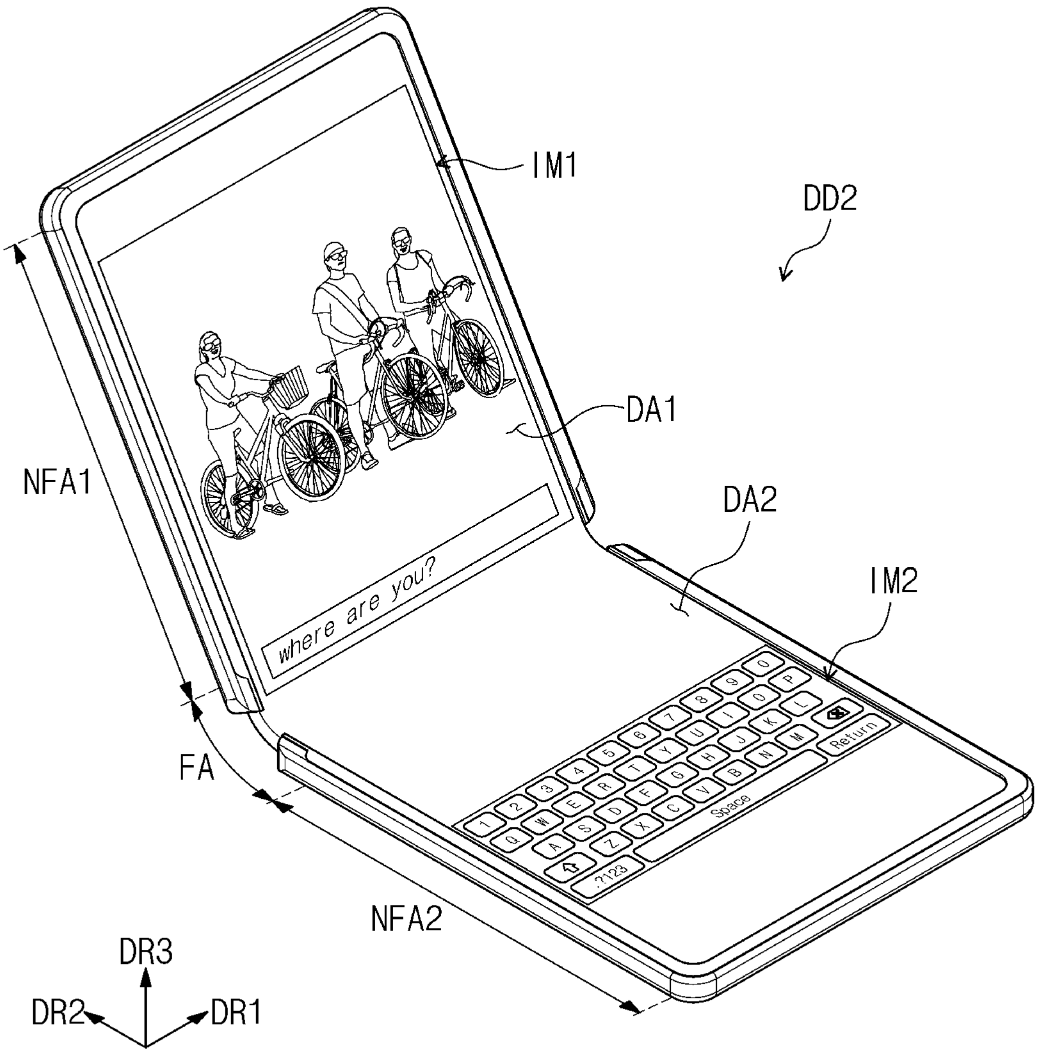

FIGS. 2A and 2B are perspective views of a display device DD2, according to an embodiment of the disclosure. FIG. 2A illustrates the display device DD2 in an unfolded state. FIG. 2B illustrates the display device DD2 in a folded state.

In an embodiment, as shown in FIGS. 2A and 2B, the display device DD2 includes the display area DA and the non-display area NDA. The display device DD2 may display an image through the display area DA. The display area DA may include a plane defined by the first direction DR1 and the second direction DR2, in a state where the display device DD2 is unfolded. The thickness direction of the display device DD2 may be parallel to a third direction DR3 crossing the first direction DR1 and the second direction DR2. Accordingly, the front surfaces (or upper surfaces) and the bottom surfaces (or lower surfaces) of members constituting the display device DD2 may be defined based on the third direction DR3. The non-display area NDA may be referred to as a bezel area. In an embodiment, for example, the display area DA may have a rectangular shape. The non-display area NDA may surround the display area DA.

The display area DA may include a first non-folding area NFA1, a folding area FA, and a second non-folding area NFA2. The folding area FA may be bent about a folding axis FX extending in the first direction DR1.

When the display device DD2 is folded, the first non-folding area NFA1 and the second non-folding area NFA2 may face each other. Accordingly, in a state where the display device DD2 is fully folded, the display area DA may not be exposed to the outside, which may be referred to as "in-folding". However, embodiments are not limited thereto and the operation of the display device DD2 is not limited thereto.

In an embodiment of the disclosure, when the display device DD2 is folded, the first non-folding area NFA1 and the second non-folding area NFA2 may be opposite to each other. Accordingly, in a state where the display device DD2 is folded, the first non-folding area NFA1 may be exposed to the outside, which may be referred to as "out-folding".

The display device DD2 may perform only one operation of an in-folding operation or an out-folding operation. Alternatively, the display device DD2 may perform both the in-folding operation and the out-folding operation. In this case, the same area of the display device DD2, for example, the folding area FA may be folded inwardly and outwardly. Alternatively, some areas of the display device DD2 may be folded inwardly, and other areas may be folded outwardly.

An embodiment where a folding area and two non-folding areas are defined is illustrated in FIGS. 2A and 2B, but the number of folding areas and the number of non-folding areas are not limited thereto. In an alternative embodiment, for example, the display device DD2 may include a plurality of non-folding areas, of which the number is greater than two, and a plurality of folding areas, each of which is interposed between non-folding areas adjacent to one another.

FIGS. 2A and 2B illustrates an embodiment where the folding axis FX is parallel to the minor axis of the display device DD2. However, the disclosure is not limited thereto. In an alternative embodiment, for example, the folding axis FX may extend in a direction parallel to the major axis of the display device DD2, for example, the second direction DR2.

FIGS. 2A and 2B illustrate an embodiment where the first non-folding area NFA1, the folding area FA, and the second non-folding area NFA2 may be sequentially arranged in the second direction DR2. However, the disclosure is not limited thereto. In an alternative embodiment, for example, the first non-folding area NFA1, the folding area FA, and the second non-folding area NFA2 may be sequentially arranged in the first direction DR1.

The plurality of display areas DA1 and DA2 may be defined in the display area DA of the display device DD2. FIG. 2A illustrates an embodiment where the display area DA is divided into two display areas DA1 and DA2 as an example. However, the number of display areas DA1 and DA2 is not limited thereto.

The plurality of display areas DA1 and DA2 may include the first display area DA1 and the second display area DA2. In an embodiment, for example, the first display area DA1 may be an area where the first image IM1 is displayed, and the second display area DA2 may be an area in which the second image IM2 is displayed. In an embodiment, for example, the first image IM1 may be a video, and the second image IM2 may be a still image.

The display device DD2 according to an embodiment may operate differently depending on an operating mode. The operating mode of the display device DD2 may include a normal mode and a multi-frequency mode. In the normal mode, the display device DD2 may drive both the first display area DA1 and the second display area DA2 at a normal frequency. In the multi-frequency mode, the display device DD2 according to an embodiment may drive the first display area DA1 where the first image IM1 is displayed at a first operating frequency, and may drive the second display area DA2 where the second image IM2 is displayed, at a second operating frequency. In an embodiment, the first operating frequency may be higher than or equal to the normal frequency. The second operating frequency may be lower than the first frequency.

The size of each of the first display area DA1 and the second display area DA2 may be a preset size, and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the entire folding area FA may correspond to only one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. That is, the size of the second display area DA2 may be greater than the size of the first display area DA1.

In an embodiment, the first display area DA1 may correspond to the first non-folding area NFA1, the folding area FA, and the first portion of the second non-folding area NFA2, and the second display area DA2 may be the second portion of the second non-folding area NFA2. That is, the size of the first display area DA1 may be greater than the size of the second display area DA2.

In an embodiment, as illustrated in FIG. 2B, in a state where the folding area FA is folded, the first display area DA1 may correspond to the first non-folding area NFA1, and the second display area DA2 may correspond to the folding area FA and the second non-folding area NFA2.

FIGS. 2A and 2B illustrates an embodiment where the display device DD2 has a single folding area, as an example of a display device. However, the disclosure is not limited thereto. For example, the disclosure may also be applied to a display device having two or more folding areas, a rollable display device, or a slidable display device.

Figure 3:
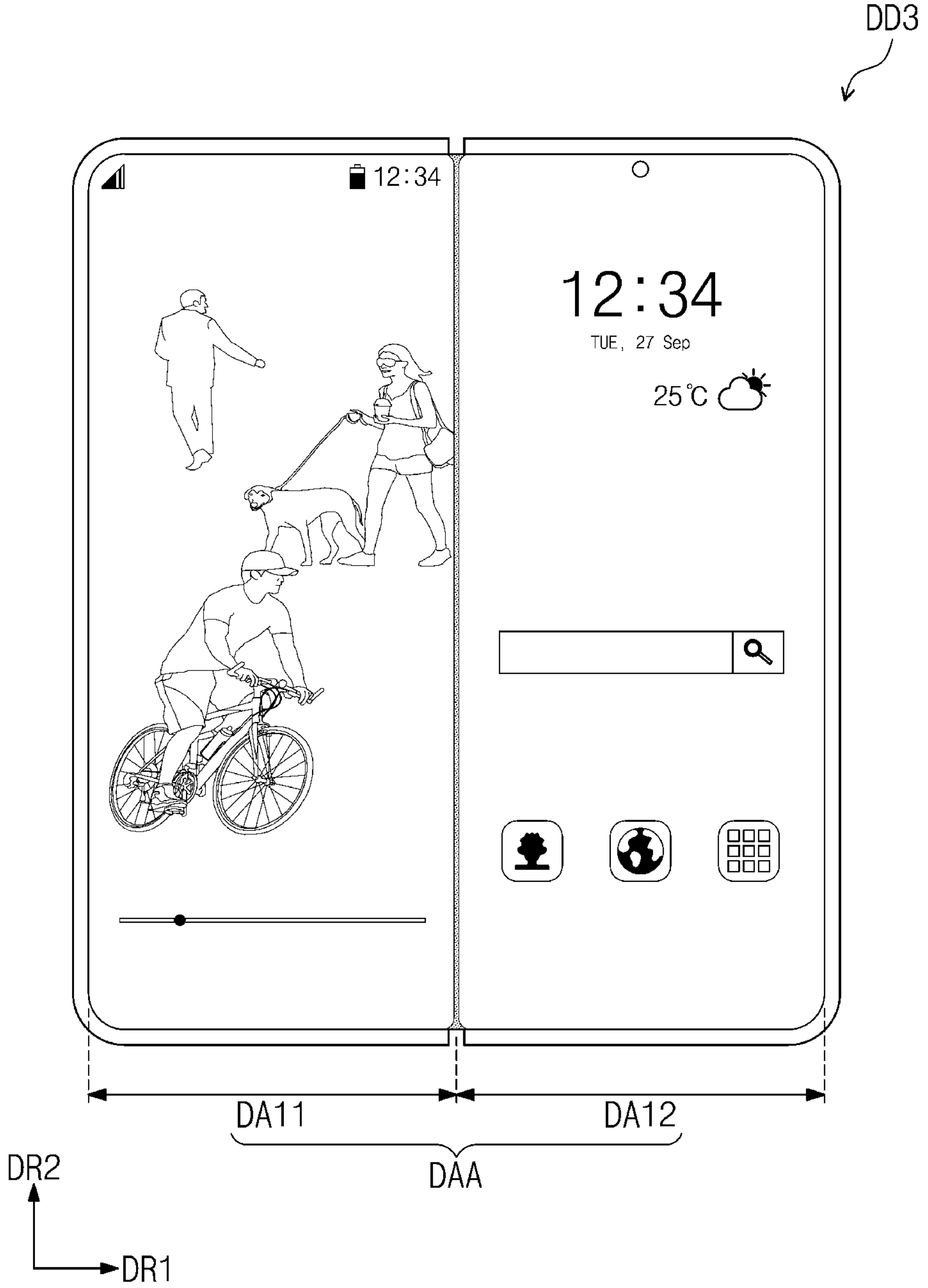
FIG. 3 is a diagram illustrating a display device, according to an embodiment of the disclosure.

FIG. 3 is a diagram showing a display device DD3, according to an embodiment of the disclosure.

Referring to FIG. 3, in an embodiment, a display area DAA of the display device DD3 includes a first display area DA11 and a second display area DA12.

The operating mode of the display device DD3 may include a normal mode and a multi-frequency mode. In the normal mode, the display device DD3 may drive both the first display area DA11 and the second display area DA12 at a normal frequency. In the multi-frequency mode, the display device DD3 according to an embodiment may drive the first display area DA11 where a video is displayed at a first operating frequency, and may drive the second display area DA12 where a still image is displayed, at a second operating frequency. In an embodiment, the first operating frequency may be higher than or equal to the normal frequency. The second operating frequency may be lower than the first frequency. The display device DD3 may reduce power consumption by lowering the operating frequency of the second display area DA12.

Hereinafter, for convenience of description, an embodiment of the display device DD shown in FIG. 1 will be described in detail as an example. However, the disclosure may be identically applied to the display device DD2 shown in FIGS. 2A and 2B and the display device DD3 shown in FIG. 3.

Figure 4A:
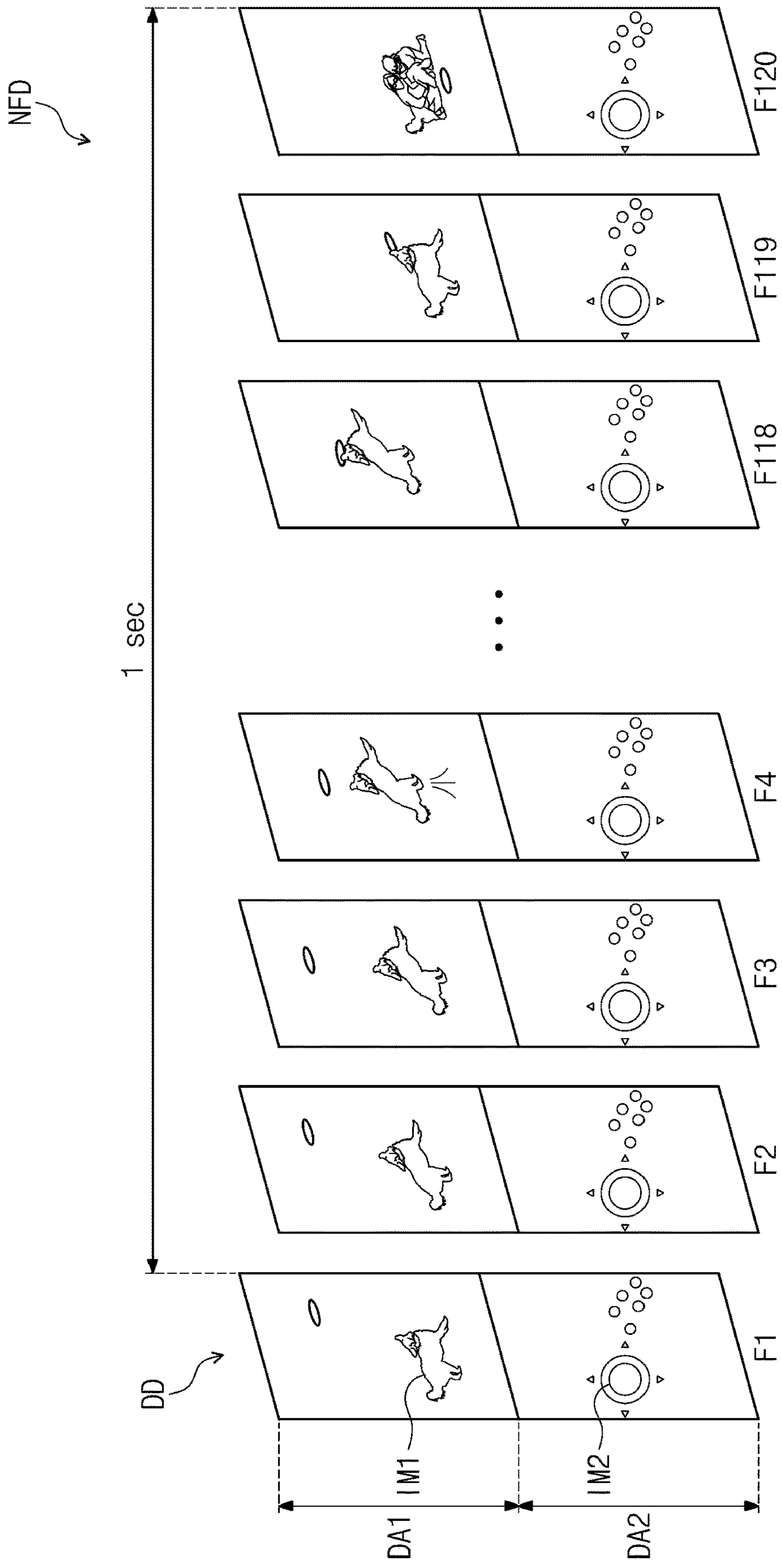
FIG. 4A is a diagram for describing an operation of a display device in a normal mode.
Figure 4B:
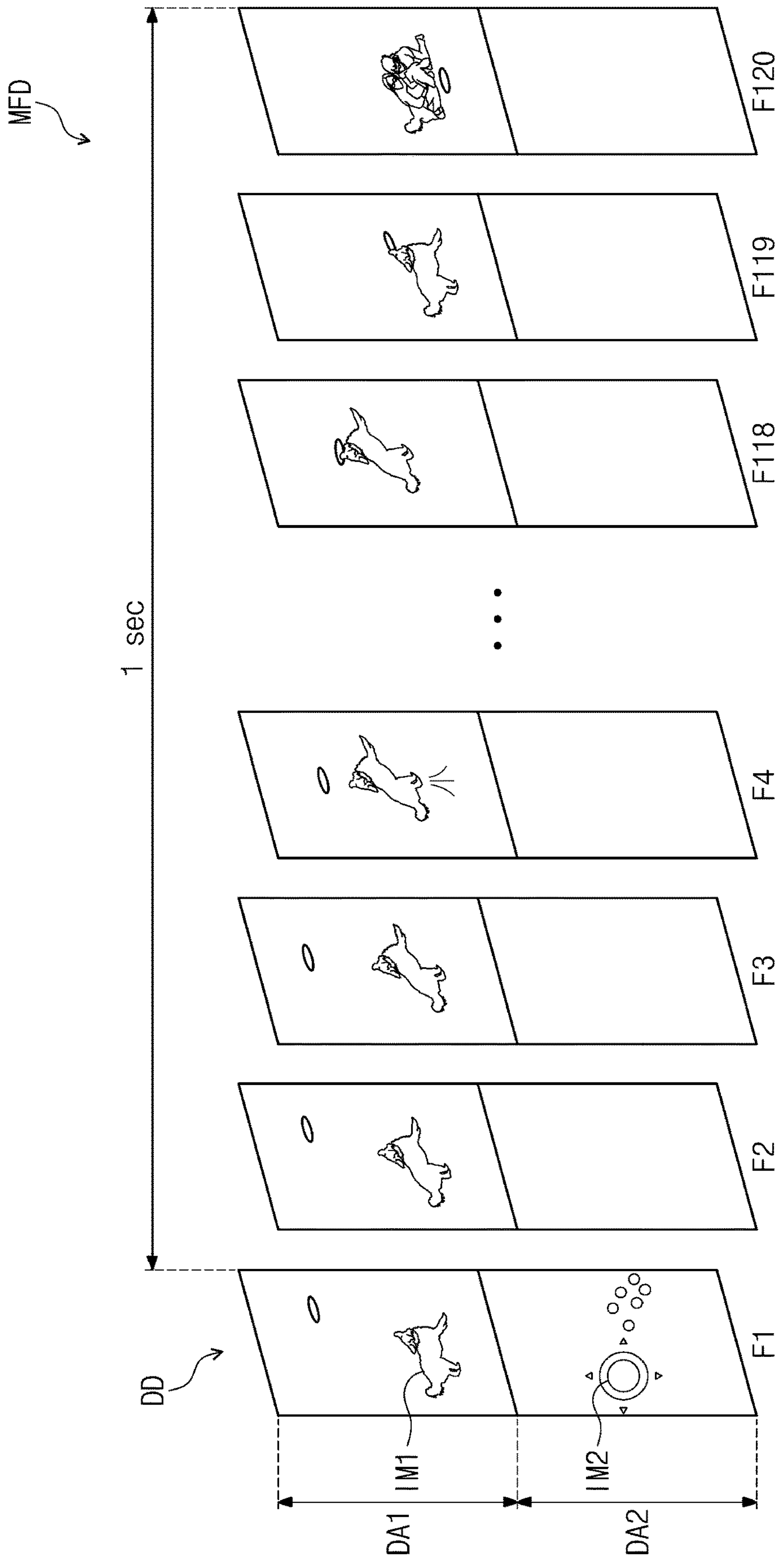
FIG. 4B is a diagram for describing an operation of a display device in a multi-frequency mode.

FIG. 4A is a diagram for describing an operation of a display device in a normal mode. FIG. 4B is a diagram for describing an operation of a display device in a multi-frequency mode.

Referring to FIG. 4A, the first image IM1 displayed in the first display area DA1 may be a video. The second image IM2 displayed in the second display area DA2 may be a still image or an image (e.g., a keypad image for manipulating a game) having a long change period. The first image IM1 displayed in the first display area DA1 and the second image IM2 displayed in the second display area DA2 that are shown in FIG. 4A are examples, and various images may be displayed on the display device DD.

In a normal mode NFD, the operating frequencies of the first display area DA1 and the second display area DA2 of the display device DD are normal frequencies. For example, the normal frequency may be 120 hertz (Hz). In a normal mode NFD, images of first to 120th frames F1 to F120 may be sequentially displayed in the first display area DA1 and the second display area DA2 of the display device DD for one second.

Referring to FIG. 4B, in a multi-frequency mode MFD, the display device DD may set an operating frequency of the first display area DA1, in which the first image IM1 (i.e., a video) is displayed, as a first operating frequency, and may set an operating frequency of the second display area DA2, in which the second image IM2 (i.e., a still image) is displayed, as a second operating frequency lower than the first operating frequency. The first operating frequency may be 120 Hz, and the second operating frequency may be 1 Hz. The first operating frequency and the second operating frequency may be variously changed.

In the multi-frequency mode MFM, when the first operating frequency is 120 Hz and the second operating frequency is 1 Hz, a data signal corresponding to the first image IM1 may be provided in the first display area DA1 of the display device DD for one second in each of the first to 120th frames F1 to F120. A data signal corresponding to the second image IM2 may be provided to the second display area DA2 during only the first frame F1. That is, because a new data signal is not provided to the second display area DA2 during the second to 120th frames F2 to F120, the second image IM2 the same as the second image IM2 during the first frame F1 may be displayed during the second to 120th frames F2 to F120.

FIG. 4B illustrates an embodiment where, in the multi-frequency mode MFD, the first operating frequency is 120 Hz and the second operating frequency is 1 Hz, but the disclosure is not limited thereto. The second operating frequency may be variously changed to a frequency lower than the first operating frequency, for example, 60 Hz, 30 Hz, 10 Hz, or the like.

Figure 5:
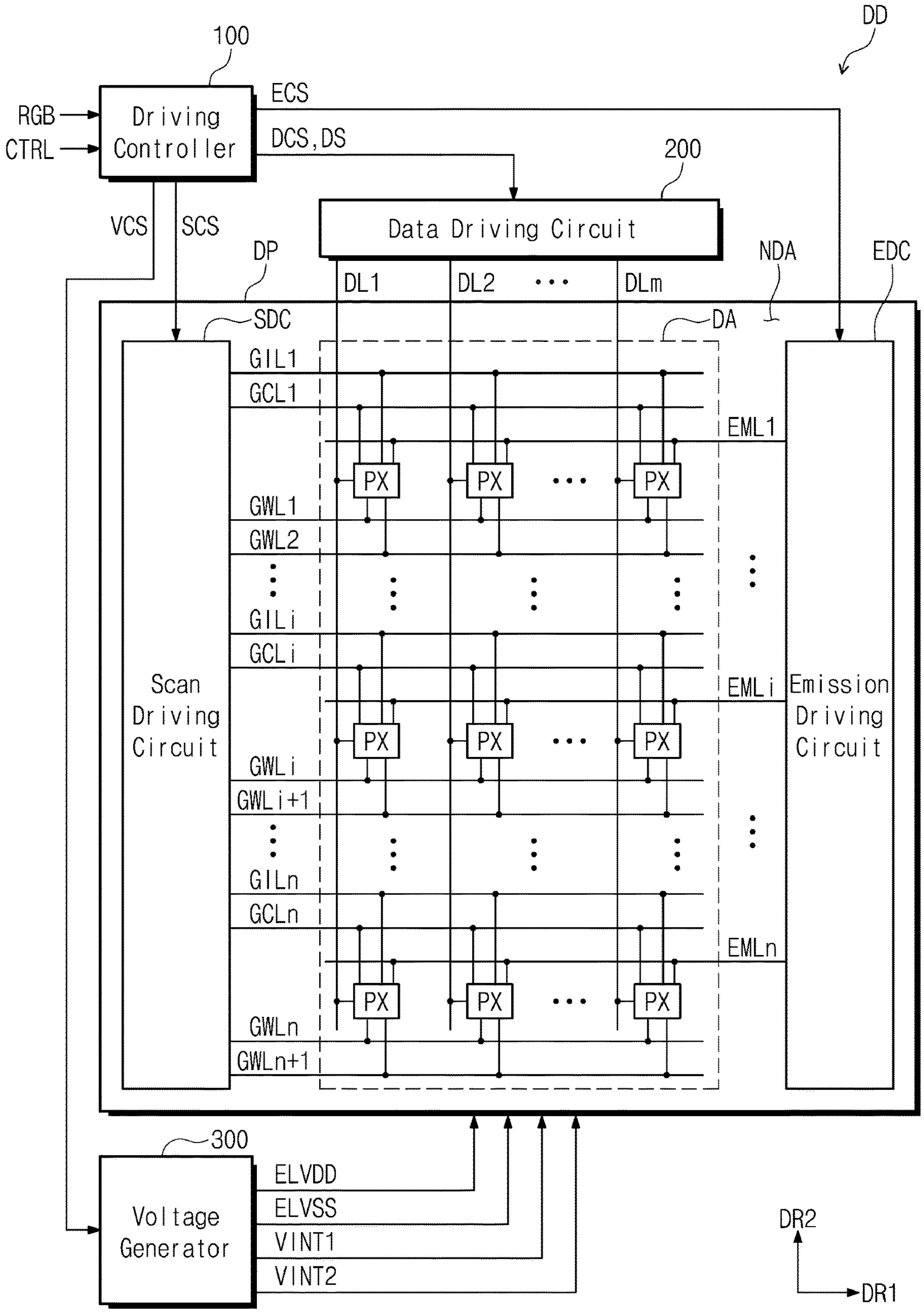
FIG. 5 is a block diagram of a display device, according to an embodiment of the disclosure.

FIG. 5 is a block diagram of a display device, according to an embodiment of the disclosure.

Referring to FIG. 5, an embodiment of the display device DD includes a display panel DP, a driving controller 100, a data driving circuit (or data driver) 200, and a voltage generator 300.

The driving controller 100 receives an image signal RGB and a control signal CTRL from an outside or an external device. The driving controller 100 converts the image signal RGB into an image data signal DS corresponding to an image to be display by the display panel DP and outputs the image data signal DS. The driving controller 100 outputs a scan control signal SCS, a data control signal DCS, an emission control signal ECS, and a voltage control signal VCS.

The data driving circuit 200 receives the data control signal DCS and the image data signal DS from the driving controller 100. The data driving circuit 200 converts the image data signal DS into data signals (e.g., data voltages) and then outputs the data signals to a plurality of data lines DL1 to DLm to be described later.

The voltage generator 300 generates voltages used for operations of the display panel DP in response to the voltage control signal VCS from the driving controller 100. In an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, the data lines DL1 to DLm, and pixels PX. The display panel DP may further include a scan driving circuit SDC and an emission driving circuit EDC. In an embodiment, the scan driving circuit SDC is arranged on a first side of the display panel DP. The scan lines GIL1 to GILn, GCL1 to GCLn, and GWL1 to GWLn+1 extend from the scan driving circuit SDC in the first direction DR1.

The emission driving circuit EDC is arranged on a second side of the display panel DP. The emission control lines EML1 to EMLn extend from the emission driving circuit EDC in a direction opposite to the first direction DR1.

The scan lines GIL1 to GILn, GCL1 to GCLn, and GWL1 to GWLn+1 and the emission control lines EML1 to EMLn are arranged spaced from one another in the second direction DR2. The data lines DL1 to DLm extend from the data driving circuit 200 in a direction opposite to the second direction DR2, and are arranged spaced from one another in the first direction DR1.

In an embodiment, as shown in FIG. 5, the scan driving circuit SDC and the emission driving circuit EDC are arranged to face each other with the pixels PX interposed therebetween, but the disclosure is not limited thereto. In an alternative embodiment, for example, the scan driving circuit SDC and the emission driving circuit EDC may be disposed adjacent to each other in the non-display area NDA of the display panel DP. In another alternative embodiment, the scan driving circuit SDC and the emission driving circuit EDC may be implemented with one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. In an embodiment, for example, as shown in FIG. 4, a first row of pixels may be connected to the scan lines GIL1, GCL1, GWL1, and GWL2 and the emission control line EML1. Furthermore, the i-th row of pixels may be connected to the scan lines GILi, GCLi, GWLi, and GWLi+1 and the emission control line EMLi, where i is a natural number less than or equal to n.

Each of the plurality of pixels PX includes a light emitting element ED (see FIG. 6) and a pixel circuit PXC (see FIG. 6) for controlling the emission of the light emitting element ED. The pixel circuit PXC may include one or more transistors and one or more capacitors. The scan driving circuit SDC and the emission driving circuit EDC may include transistors formed through a same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SDC receives the scan control signal SCS from the driving controller 100. The scan driving circuit SDC may output scan signals to the scan lines GIL1 to GILn, GCL1 to GCLn, and GWL1 to GWLn+1 in response to the scan control signal SCS.

The driving controller 100 according to an embodiment may determine an operating mode based on information included in the control signal CTRL. In an embodiment, the driving controller 100 may determine an operating mode as one of a normal mode and a multi-frequency mode based on the information included in the control signal CTRL. However, the disclosure is not limited thereto. Alternatively, the driving controller 100 may determine an operating mode depending on a mode signal provided from the outside (e.g., an application processor, a graphics processor, a host processor, or the like). A mode signal provided from the outside may indicate an operating mode, in which the display device DD operates, from among a normal mode and multi-frequency mode.

The driving controller 100 may determine an operating frequency of each of the first display area DA1 (see FIG. 1) and the second display area DA2 (see FIG. 1) of the display panel DP depending on the determined operating mode.

In an embodiment, when the determined operating mode is a normal mode, as shown in FIG. 4A, the driving controller 100 drives the first display area DA1 and the second display area DA2 at a normal frequency (e.g., 120 Hz).

When the determined operating mode is a multi-frequency mode, the driving controller 100 may separate the display panel DP into the first display area DA1 and the second display area DA2, and may set an operating frequency of each of the first display area DA1 and the second display area DA2. In an embodiment, for example, in the multi-frequency mode, the driving controller 100 may drive the first display area DA1 at a first operating frequency (e.g., 120 Hz) and may drive the second display area DA2 at a second operating frequency (e.g., 1 Hz).

The driving controller 100 according to an embodiment of the disclosure may accumulate stress data based on the image signal RGB and may output the image data signal DS obtained by compensating for the image signal RGB depending on the accumulated stress data. The operation of the driving controller 100 will be described in detail later.

Figure 6:
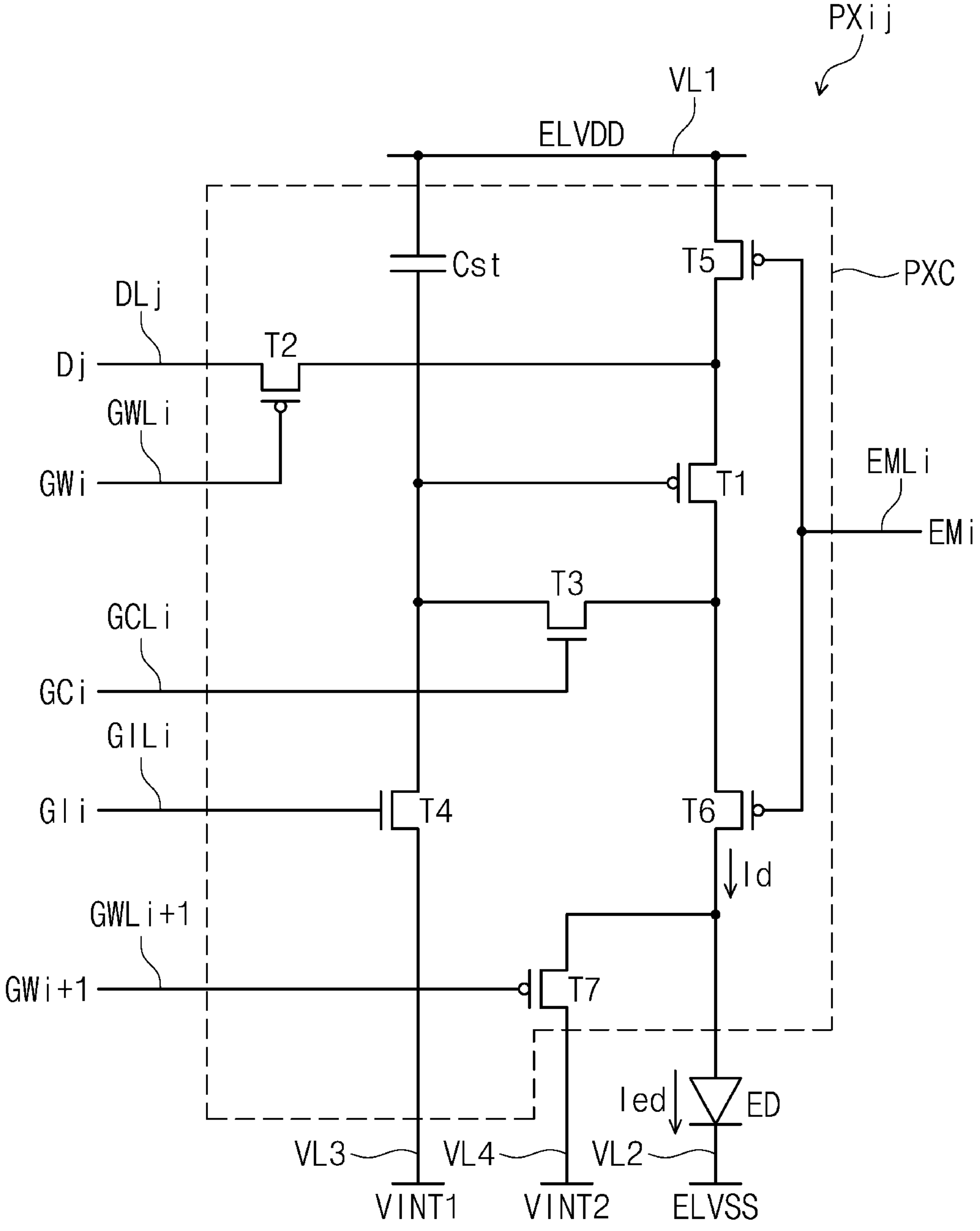
FIG. 6 is a circuit diagram of a pixel, according to an embodiment of the disclosure.

FIG. 6 is a circuit diagram of a pixel, according to an embodiment of the disclosure.

FIG. 6 illustrates an equivalent circuit diagram of a pixel PXij connected to a j-th data line DLj among the data lines DL1 to DLm, an i-th scan lines GILi, GCLi, and GWLi and an (i+1)-th scan line GWLi+1 among the scan lines GIL1 to GILn, GCL1 to GCLn, and GWL1 to GWLn+1, and an i-th emission control line EMLi among the emission control lines EML1 to EMLn, which are illustrated in FIG. 5.

Each of the plurality of pixels PX shown in FIG. 5 may have a same circuit configuration as the equivalent circuit diagram of the pixel PXij shown in FIG. 6.

Referring to FIG. 6, the pixel PXij of a display device according to an embodiment includes a pixel circuit PXC and at least one light emitting element ED. In an embodiment, the light emitting element ED may be a light emitting diode. In an embodiment, each pixel PXij may include a single light emitting element ED. The pixel circuit PXC includes first to seventh transistors T1, T2, T3, T4, T5, T6, and T7 and a capacitor Cst.

In an embodiment, the third and fourth transistors T3 and T4 among the first to seventh transistors T1 to T7 are N-type transistors by using an oxide semiconductor as a semiconductor layer. Alternatively, each of the first, second, fifth, sixth, and seventh transistors T1, T2, T5, T6, and T7 is a P-type transistor having a low-temperature polycrystalline silicon (LTPS) semiconductor layer. However, the disclosure is not limited thereto. In an embodiment, for example, all of the first to seventh transistors T1 to T7 may be P-type transistors or N-type transistors. In an embodiment, at least one of the first to seventh transistors T1 to T7 may be an N-type transistor, and the other(s) thereof may be P-type transistors. Moreover, the circuit configuration of a pixel according to an embodiment of the disclosure is not limited to an embodiment of FIG. 6. The pixel circuit PXC illustrated in FIG. 6 is only an example, and the configuration of the pixel circuit PXC may be modified or variously implemented.

The scan lines GILi, GCLi, GWLi, and GWLi+1 may deliver (or transmit) scan signals GIi, GCi, GWi, and GWi+1, respectively. The emission control line EMLi may deliver an emission signal EMi. The data line DLj delivers a data signal Dj. The data signal Dj may have a voltage level corresponding to the image signal RGB that is input to the display device DD (see FIG. 5). First to fourth driving voltage lines VL1, VL2, VL3, and VL4 may transfer a first driving voltage ELVDD, a second driving voltage ELVSS, a first initialization voltage VINT1, and a second initialization voltage VINT2, respectively.

The first transistor T1 includes a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Dj delivered through the data line DLj depending on the switching operation of the second transistor T2 and then may supply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on in response to the scan signal GWi transferred through the scan line GWLi and may transfer the data signal Dj transferred through the data line DLj to the first electrode of the first transistor T1.

The third transistor T3 includes a first electrode connected with the gate electrode of the first transistor T1, a second electrode connected with the second electrode of the first transistor T1, and a gate electrode connected with the scan line GCLi. The third transistor T3 may be turned on in response to the scan signal GCi transferred through the scan line GCLi, and thus, the gate electrode and the second electrode of the first transistor T1 may be connected to each other, that is, the first transistor T1 may be diode-connected.

The fourth transistor T4 includes a first electrode connected with the gate electrode of the first transistor T1, a second electrode connected with the third driving voltage line VL3 through which the first initialization voltage VINT1 is transferred, and a gate electrode connected with the scan line GILi. The fourth transistor T4 may be turned on in response to the scan signal GIi transferred through the scan line GILi such that the first initialization voltage VINT1 is transferred to the gate electrode of the first transistor T1. Accordingly, an initialization operation of initializing a voltage of the gate electrode of the first transistor T1 may be performed.

The fifth transistor T5 includes a first electrode connected to the first driving voltage line VL1, a second electrode connected to the first electrode of the first transistor T1, and a gate electrode connected to the emission control line EMLi.

The sixth transistor T6 includes a first electrode connected with the second electrode of the first transistor T1, a second electrode connected with the anode of the light emitting element ED, and a gate electrode connected with the emission control line EMLi.

The fifth transistor T5 and the sixth transistor T6 may be simultaneously turned on in response to the emission control signal EMi transferred through the emission control line EMLi. In this way, the first driving voltage ELVDD may be compensated for through the diode-connected transistor T1 to be supplied to the light emitting element ED.

The seventh transistor T7 includes a first electrode connected to the second electrode of the sixth transistor T6, a second electrode connected to the fourth driving voltage line VL4, and a gate electrode connected to the scan line GWLi+1. The seventh transistor T7 is turned on in response to the scan signal GWi+1 transferred through the scan line GWLi+1 and bypasses a current of the anode of the light emitting element ED to the fourth voltage line VLA.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2, to which the second driving voltage ELVSS is delivered. The structure of the pixel PXij according to an embodiment is not limited to the structure illustrated in FIG. 5. In an embodiment, for example, the number of transistors included in the one pixel PXij, the number of capacitors included in the pixel PXij, and the connection relationship between the transistors and the capacitors may be variously modified.

Figure 7A:
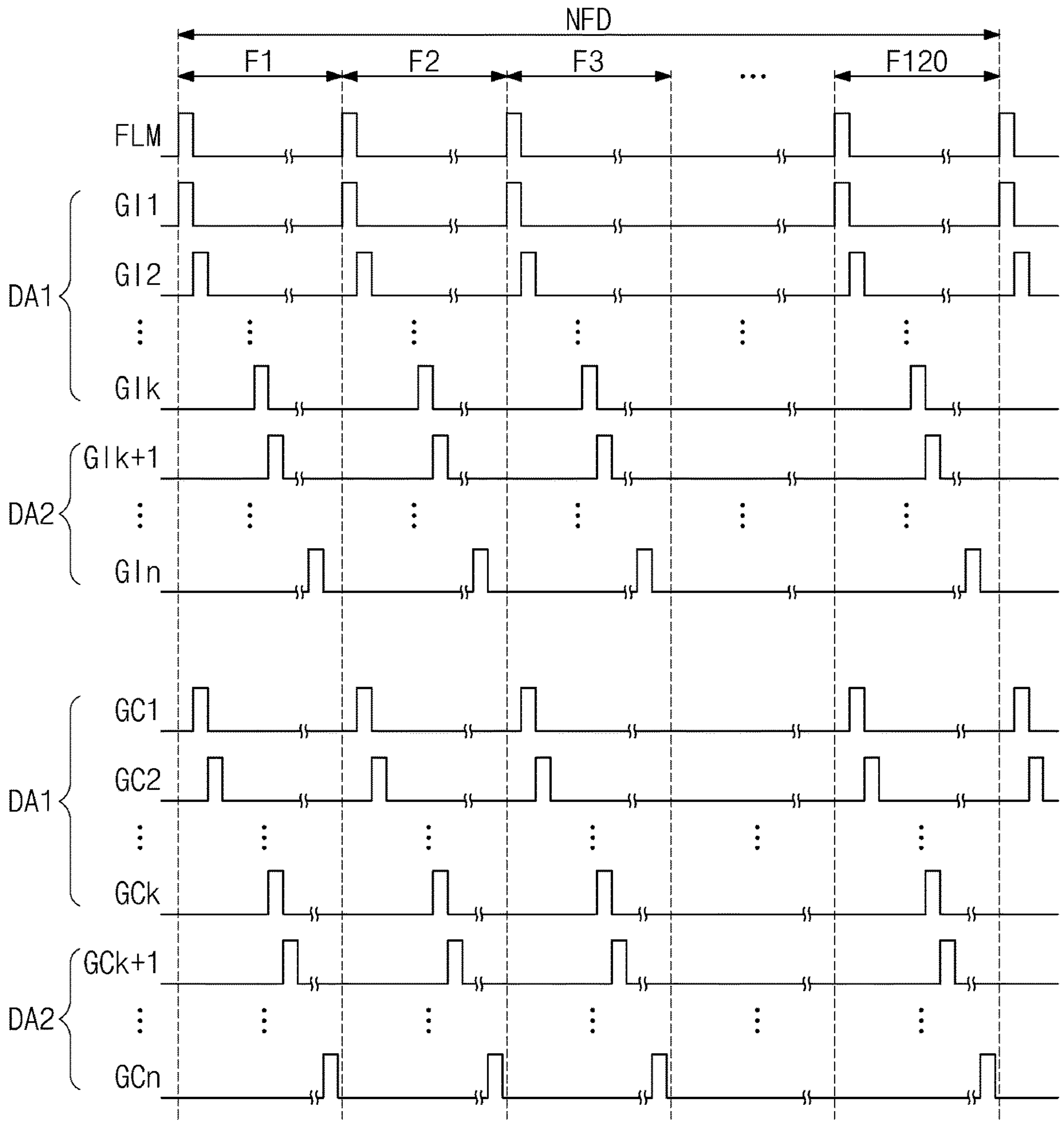
FIG. 7A illustrates the scan signals and the scan signals output from a scan driving circuit shown in FIG. 5 in a normal mode.

FIG. 7A illustrates the scan signals GI1 to GIn and the scan signals GC1 to GCn output from the scan driving circuit SDC shown in FIG. 5 in a normal mode.

Figure 7B:
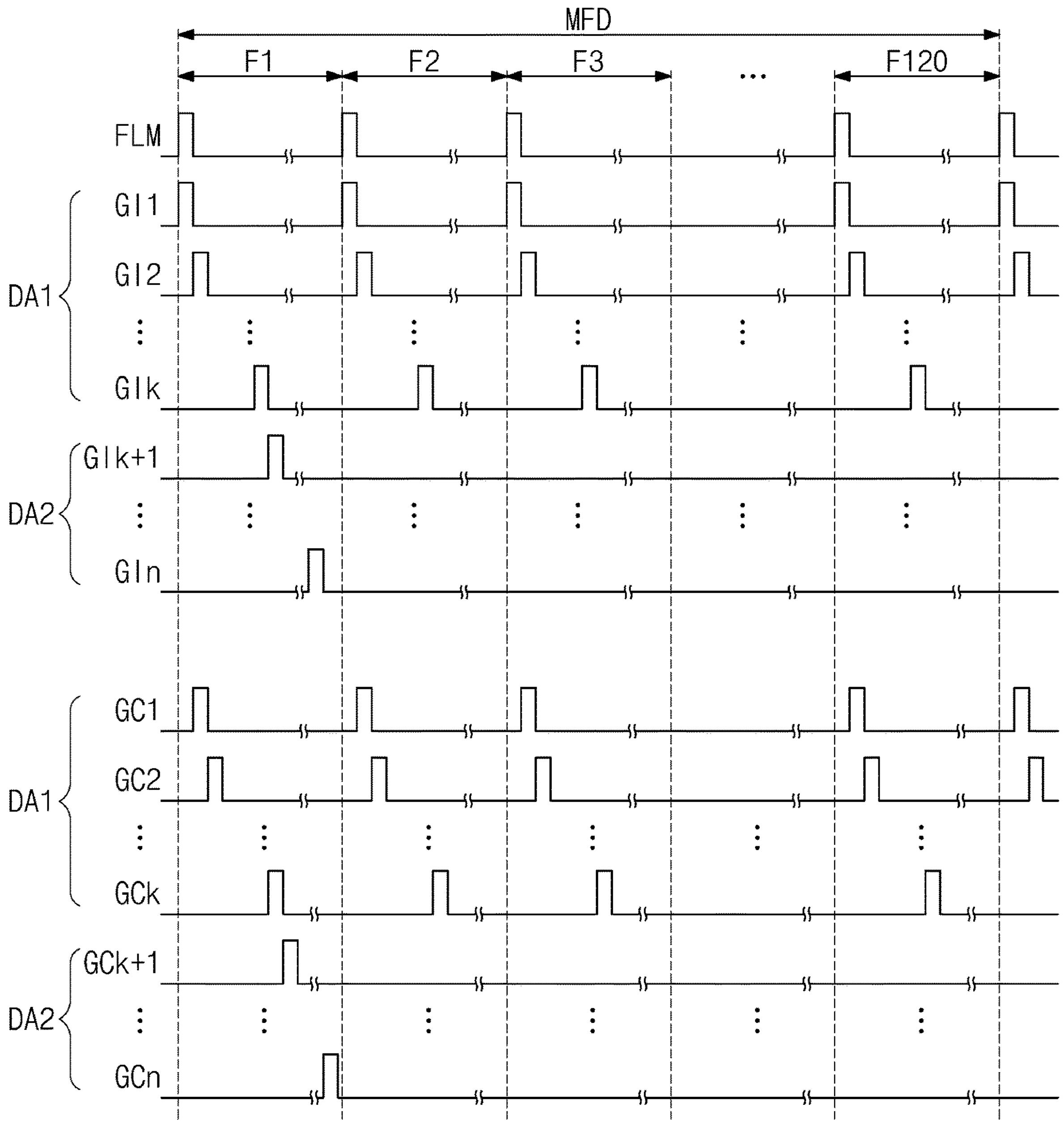
FIG. 7B illustrates scan signals and scan signals output from a scan driving circuit shown in FIG. 5 in a multi-frequency mode.

FIG. 7B illustrates the scan signals GI1 to GIn and the scan signals GC1 to GCn output from the scan driving circuit SDC shown in FIG. 5 in a multi-frequency mode.

FIGS. 7A and 7B show a case where the first display area DA1 shown in FIG. 1 corresponds to the scan signals GI1 to GIk and the scan signals GC1 to GCk, and the second display area DA2 shown in FIG. 1 corresponds to the scan signals GIk+1 to GIn and the scan signals GCk+1 to GCn. The number of scan signals corresponding to the first display area DA1 and the number of scan signals corresponding to the second display area DA2 may be variously changed.

First of all, referring to FIGS. 5 and 7A, the scan control signal SCS may include a start signal FLM. The start signal FLM may be a signal indicating the start of one frame. The start signal FLM may transition to an active level (e.g., a high level) in each of the first to 120th frames F1 to F120.

The scan driving circuit SDC generates the scan signals GI1 to GIn and the scan signals GC1 to GCn in response to the start signal FLM. When the operating frequency is a first operating frequency (e.g., 120 Hz) in the normal mode NFD, the scan driving circuit SDC sequentially activates the scan signals GI1 to GIn to high levels during the first to 120th frames F1 to F120, and sequentially activates the scan signals GC1 to GCn to high levels during the first to 120th frames F1 to F120. The scan signals GI1 to GIn and the scan signals GC1 to GCn are only shown in FIG. 7A. However, the scan signals GW1 to GWn+1 and the emission control signals EM1 to EMn may also be sequentially activated to low levels during the frames F1 to F120 in the normal mode NFD.

As such, in the normal mode NFD, the frequency of each of the scan signals GI1 to GIn or the frequency of each of the scan signals GC1 to GCn may be the first operating frequency (e.g., 120 Hz).

Referring to FIGS. 5 and 7B, when the operating frequency is the second operating frequency (e.g., 1 Hz) in the multi-frequency mode MFD, the scan driving circuit SDC sequentially activates the scan signals GI1 to GIn and the scan signals GC1 to GCn to high levels during the first frame F1. During the second to 120th frames F2 to F120, the scan driving circuit SDC sequentially activates the scan signals GI1 to GIk to high levels and maintains the scan signals GIk+1 to GIn at inactive levels (e.g., low levels).

Moreover, during the second to 120th frames F2 to F120, the scan driving circuit SDC sequentially activates the scan signals GC1 to GCk to high levels, and maintains the scan signals GCk+1 to GCn at inactive levels (e.g., low levels).

The first frame F1 of the multi-frequency mode MFD may be referred to as a "full driving frame" during which both the first display area DA1 and the second display area DA2 are driven. Furthermore, each of the second to 120th frames F2 to F120 of the multi-frequency mode MFD may be referred to as a "masking enable frame" during which only the first display area DA1 is driven.

Although not shown in FIG. 7B, during the second to 120th frames F2 to F120 of the multi-frequency mode MFD, the scan signals GW1 to GWn+1 may be sequentially activated to low levels. Likewise, during the second to 120th frames F2 to F120 of the multi-frequency mode MFD, the emission control signals EM1 to EMn may be sequentially activated to low levels.

As such, in the multi-frequency mode MFD, the frequency of each of the scan signals GI1 to GIn or the frequency of each of the scan signals GC1 to GCn may be a second operating frequency (e.g., 1 Hz) lower than the first operating frequency (e.g., 120 Hz).

As the scan signals GIk+1 to GIn and the scan signals GCk+1 to GCn are maintained at inactive levels (i.e., low levels) during the second to 120th frames F2 to F120 of the multi-frequency mode MFD, the second display area DA2 of the display panel DP is driven at a frequency lower than the normal frequency. Accordingly, in such an embodiment, the display device DD may reduce power consumption by lowering the operating frequency of the second display area DA2.

Figure 8:
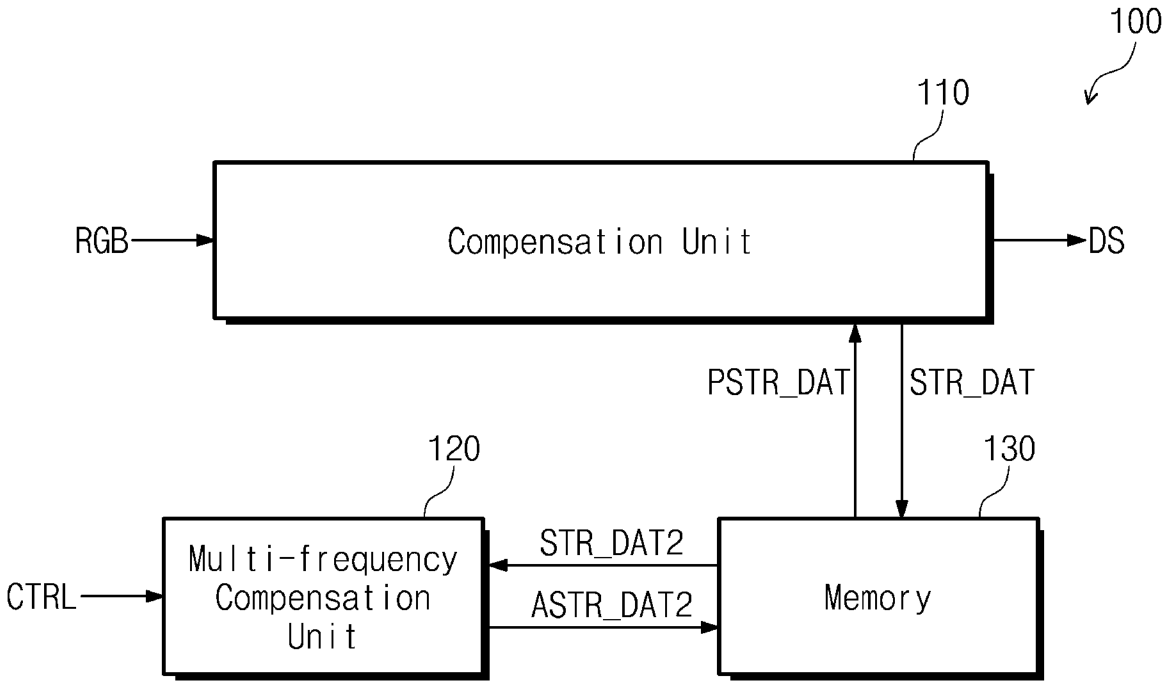
FIG. 8 is a block diagram of a driving controller, according to an embodiment of the disclosure.

FIG. 8 is a block diagram of the driving controller 100, according to an embodiment of the disclosure.

Referring to FIG. 8, in an embodiment, the driving controller 100 includes a compensation unit 110, a multi-frequency compensation unit 120, and a memory 130.

The compensation unit 110 calculates stress data STR_DAT based on the image signal RGB and previous stress data (or stress data of a previous frame) PSTR_DAT and outputs the image data signal DS corresponding to the image signal RGB based on the stress data STR_DAT. The stress data STR_DAT calculated by the compensation unit 110 may be provided or saved to the memory 130.

The light emitting element ED and the first to seventh transistors T1 to T7 in the pixel PXij shown in FIG. 6 may deteriorate depending on an operating time. This degradation may change characteristics of the pixel PXij. Moreover, the degradation rate of the pixel PXij may vary depending on the image signal RGB. For example, as the luminance of the image signal RGB is high, the deterioration rate of the pixel PXij may be high. When a range of characteristic change of the pixel PXij increases as the operating time of the pixel PXij is long, the display quality may deteriorate.

The compensation unit 110 may store a compensation value according to the operating time of the pixel PXij in advance. The compensation unit 110 calculates the stress data STR_DAT based on the image signal RGB, the operating time of the pixel PXij, and the compensation value. In such an embodiment, the stress data STR_DAT is desired to be accumulated as the operating time of the pixel PXij.

The memory 130 may store the stress data STR_DAT of a previous frame from the compensation unit 110 (i.e., the stress data STR_DAT previously calculated by the compensation unit 110) and may provide the stored stress data STR_DAT to the compensation unit 110 as previous stress data PSTR_DAT.

The multi-frequency compensation unit 120 may determine an operating mode of the display device DD based on the control signal CTRL. In an embodiment, the multi-frequency compensation unit 120 may determine the operating mode as one of a normal mode and a multi-frequency mode based on the control signal CTRL.

When the operating mode is the multi-frequency mode and the current frame is the masking enable frame MEF, the multi-frequency compensation unit 120 counts the number of consecutive masking enable frames MEF.

When the current frame is the masking enable frame MEF, the multi-frequency compensation unit 120 calculates the accumulated second stress data ASTR_DAT2 based on the second stress data STR_DAT2, which corresponds to the second display area DA2 (see FIG. 1), from among the stress data STR_DAT stored in the memory 130, and the number of consecutive masking enable frames MEF. The accumulated second stress data ASTR_DAT2 may be stored in the memory 130.

Figure 9:
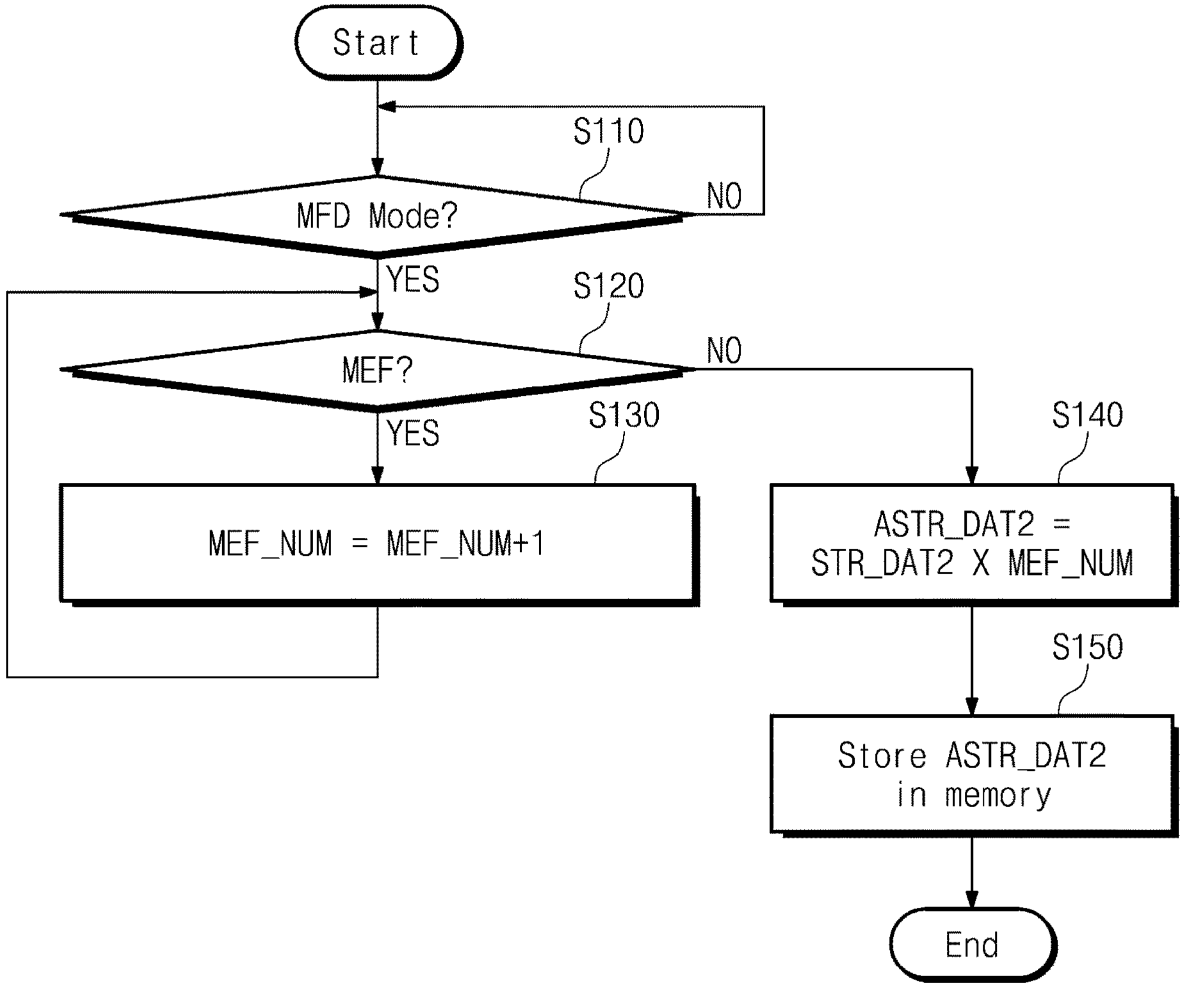
FIG. 9 is a flowchart showing an operation of a multi-frequency compensation unit, according to an embodiment of the disclosure.

FIG. 9 is a flowchart showing an operation of the multi-frequency compensation unit 120, according to an embodiment of the disclosure.

Figure 10:
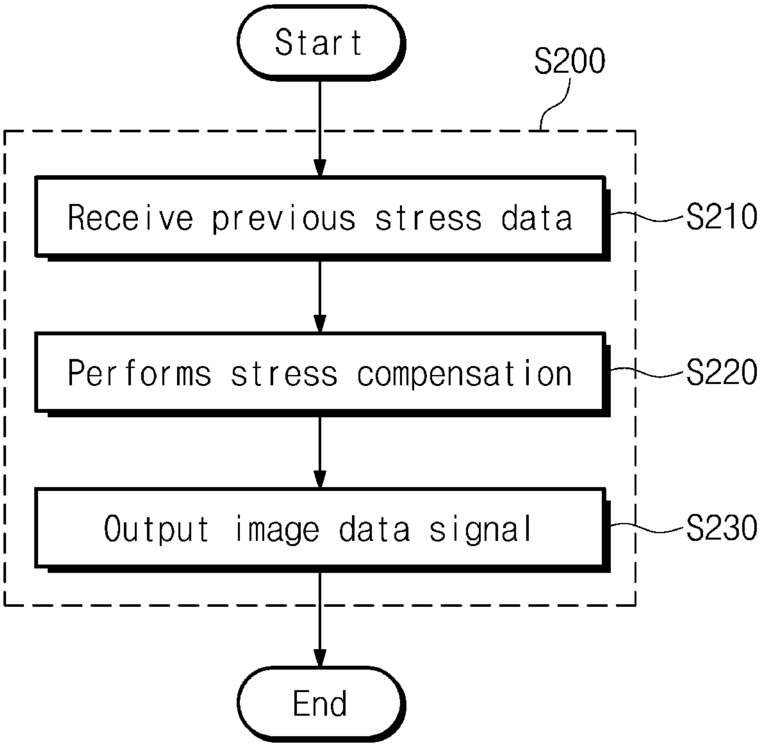
FIG. 10 is a flowchart showing an operation of a compensation unit, according to an embodiment of the disclosure.

FIG. 10 is a flowchart showing an operation of the compensation unit 110, according to an embodiment of the disclosure.

Figure 11A:
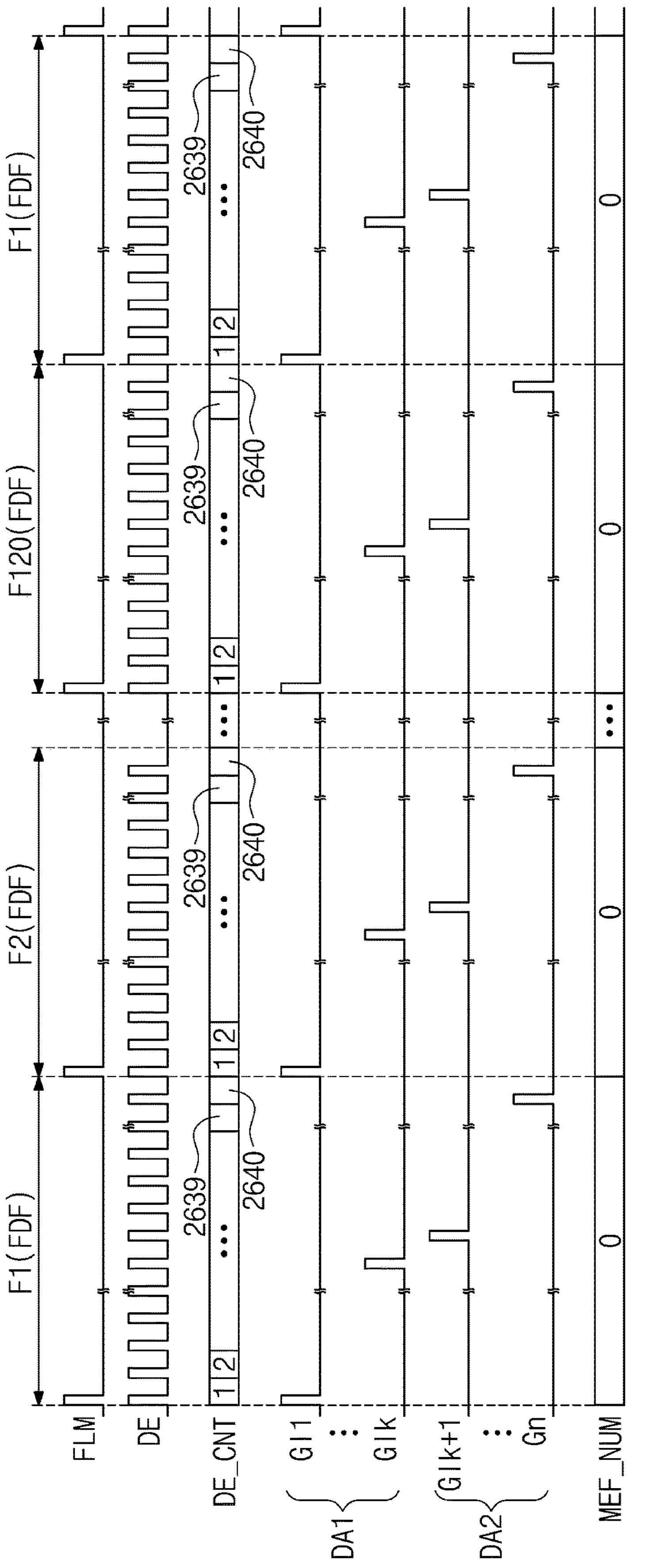
FIG. 11A is a timing diagram showing signals used in a display device when an operating mode is a normal mode.
Figure 11B:
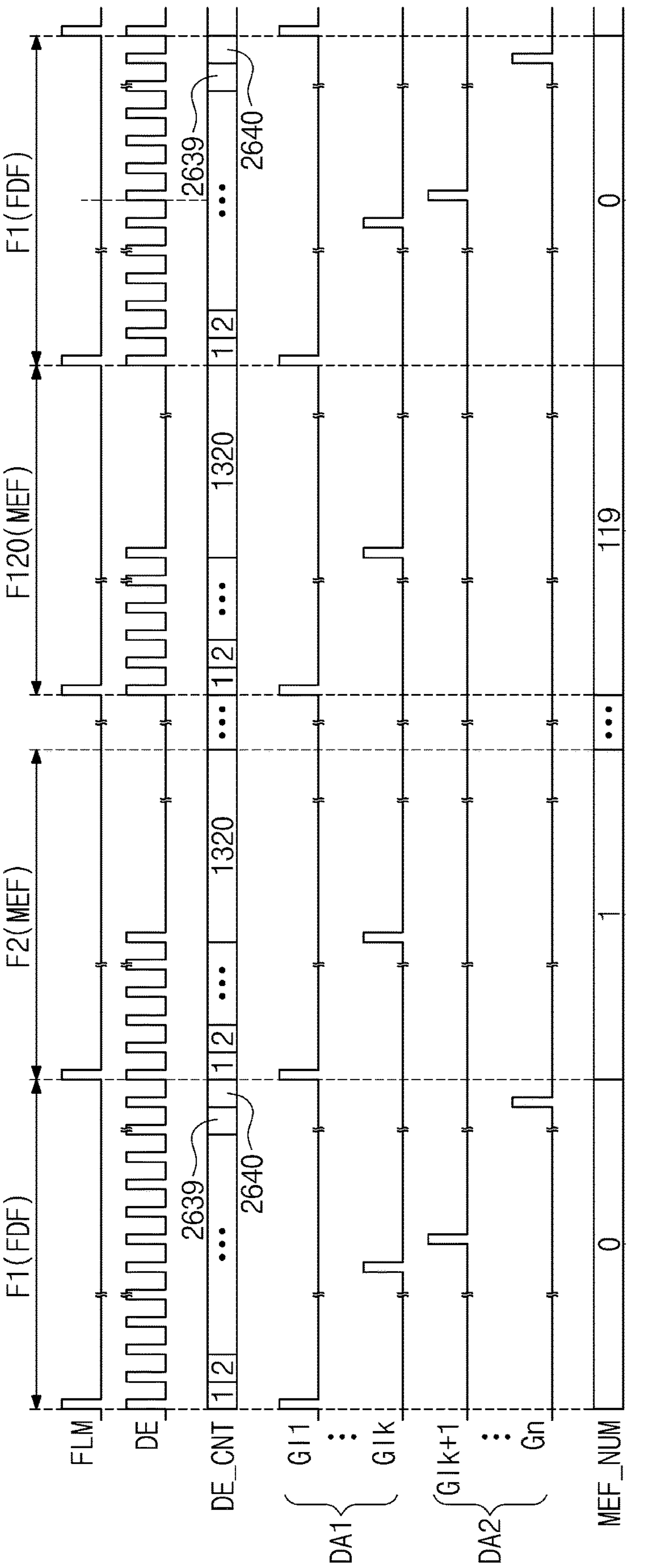
FIG. 11B is a timing diagram showing signals used in a display device when an operating mode is a multi-frequency mode.

FIG. 11A is a timing diagram showing signals used in the display device DD when an operating mode is a normal mode. FIG. 11B is a timing diagram showing signals used in the display device DD when an operating mode is a multi-frequency mode.

In the following description, for convenience, an operation of the display device DD will be described with reference to the driving controller 100 shown in FIG. 8, but the disclosure is not limited thereto.

Referring to FIGS. 8 and 9, the operation of the driving controller 100 in the display device DD may be divided into three cases: a case that the operating mode is the normal mode NFD (case I), a case that the operating mode is the multi-frequency mode MFD and the current frame is the full driving frame FDF (case II), and a case that the operating mode is the multi-frequency mode MFD and the current frame is the masking enable frame MEF (case III).

When the operating mode is a normal mode, the operation of the display device DD is as follows.

Referring to FIGS. 8, 9, and 11A, the multi-frequency compensation unit 120 determines an operating mode of the display device DD based on the control signal CTRL. The multi-frequency compensation unit 120 determines whether the operating mode is the multi-frequency mode MFD (operation S110). When the operating mode is not a multi-frequency mode (i.e., when the operating mode is a normal mode), the multi-frequency compensation unit 120 does not perform a multi-frequency compensation operation.

The scan control signal SCS provided from the driving controller 100 shown in FIG. 5 to the scan driving circuit SDC may include the start signal FLM. The start signal FLM may be a signal indicating the start of one frame. The start signal FLM may transition to an active level (e.g., a high level) in each of the first to 120th frames F1 to F120, as shown in FIGS. 7A and 7B.

In the normal mode, the scan driving circuit SDC may sequentially activate the scan signals GI1 to GIn to high levels in the first to 120th frames F1 to F120 in response to the start signal FLM. In the normal mode, each of the first to 120th frames F1 to F120 may be the full driving frame FDF.

The control signal CTRL received by the driving controller 100 shown in FIG. 5 may include a data enable signal DE. When the valid image signal RGB is received, the data enable signal DE may be a signal that transitions to an active level for each horizontal line. In an embodiment, for example, where the pixels PX disposed on the display panel DP are placed on 2640 horizontal lines (i.e., n=2640), the data enable signal DE transitions to an active level 2640 times in the normal mode.

In an embodiment, the multi-frequency compensation unit 120 may include a counter that counts up whenever the enable signal DE transitions to the active level. The multi-frequency compensation unit 120 may determine whether the current frame, which will be described later, is a masking enable frame, based on a count signal DE_CNT of a counter.

Referring to FIGS. 8, 10, and 11A, the compensation unit 110 receives the previous stress data PSTR_DAT from the memory 130 (operation S210).

The compensation unit 110 calculates the stress data STR_DAT based on the previous stress data PSTR_DAT and performs stress compensation on the image signal RGB based on the stress data STR_DAT (operation S220).

The compensation unit 110 outputs the stress-compensated image data signal DS (operation S230). The stress data STR_DAT calculated by the compensation unit 110 is stored into the memory 130.

When the operating mode is the multi-frequency mode MFD and the current frame is the full driving frame FDF (case II), the operation of the driving controller 100 in the display device DD is as follows.

Referring to FIGS. 9 and 11B, when the operating mode is the multi-frequency mode MFD (operation S110), the multi-frequency compensation unit 120 determines whether the current frame is the masking enable frame MEF (operation S120).

The multi-frequency compensation unit 120 may determine whether the current frame is the masking enable frame MEF, based on a count signal DE_CNT of a counter.

Because the data enable signal DE is a signal that transitions to an active level for every horizontal line when the valid image signal RGB is received, the data enable signal DE of the multi-frequency mode MFD is maintained at an inactive level (e.g., a low level) when the second display area DA2 is driven.

In an embodiment where the display panel DP includes 2640 horizontal lines (i.e., n=2640), the count signal DE_CNT may be the maximum value of 2640 during the full driving frame FDF of the multi-frequency mode MFD.

In a case where the display panel DP includes 2640 horizontal lines (i.e., n=2640), the first display area DA1 includes 1320 horizontal lines, and the first display area DA1 includes 1320 horizontal lines, the count signal DE_CNT of the counter may correspond to 1320 during the masking enable frame MEF of the multi-frequency mode MFD.

When the count signal DE_CNT of the counter is less than the maximum value (e.g., 2640), the multi-frequency compensation unit 120 may determine the current frame as the masking enable frame MEF. When the count signal DE_CNT of the counter is equal to a reference value (e.g., the maximum value of 2640), the multi-frequency compensation unit 120 may determine the current frame as the full driving frame FDF.

When the operating mode is the multi-frequency mode MFD and the current frame is not the masking enable frame MEF (operation S110 and operation S120) (i.e., when the current frame is the full driving frame FDF), the multi-frequency compensation unit 120 does not perform a multi-frequency compensation operation. In an embodiment, as shown in FIG. 11B, the first frame F1 is the full driving frame FDF in which all of the scan signals GI1 to GIn are driven.

When the operating mode is the multi-frequency mode MFD and the current frame is the full driving frame FDF, an operation of the compensation unit 110 is the same as an operation in the case where the operating mode is the normal mode NFD.

When the operating mode is the multi-frequency mode MFD and the current frame is the masking enable frame MEF (case III), the operation of the driving controller 100 in the display device DD is as follows.

Referring to FIGS. 9 and 11B, when the operating mode is the multi-frequency mode MFD (operation S110), the multi-frequency compensation unit 120 determines whether the current frame is the masking enable frame MEF (operation S120).

When the count signal DE_CNT of the counter is less than the reference value (e.g., 2640), the multi-frequency compensation unit 120 may determine the current frame as the masking enable frame MEF.

In an embodiment, as shown in FIG. 11B, each of the second to 120th frames F2 to F120 is the masking enable frame MEF. When the current frame is the masking enable frame MEF, the multi-frequency compensation unit 120 counts the number MEF_NUM of consecutive masking enable frames MEF. In other words, when the current frame is the masking enable frame MEF, the multi-frequency compensation unit 120 counts up the number MEF_NUM of consecutive masking enable frame MEF by 1 (operation S130). For example, in the second frame F2, the number MEF_NUM of consecutive masking enable frame MEF is 1. In the 120th frame F120, the number MEF_NUM of consecutive masking enable frame MEF is 119.

When the current frame is not the masking enable frame MEF, the multi-frequency compensation unit 120 calculates the accumulated second stress data ASTR_DAT2 by multiplying the second stress data STR_DAT2 from the memory 130 and the number MEF_NUM of consecutive masking enable frames MEF (operation S140).

The multi-frequency compensation unit 120 stores the accumulated second stress data ASTR_DAT2 in the memory 130 (operation S150).

The second stress data STR_DAT2 is stress data corresponding to the second display area DA2 of the display panel DP. During the masking enable frame MEF, the image signal RGB corresponding to the second display area DA2 is not received. Accordingly, the compensation unit 110 may not calculate the stress data STR_DAT corresponding to the second display area DA2.

Even when the valid image signal RGB corresponding to the second display area DA2 is not received during the second to 120th frames F2 to F120, the same image as an image during the first frame F1 is displayed in the second display area DA2 of the display panel DP. When the operating mode is the multi-frequency mode MFD and the current frame is the masking enable frame MEF, the multi-frequency compensation unit 120 calculates the accumulated second stress data ASTR_DAT2 during the consecutive masking enable frames MEF and may stores the accumulated second stress data ASTR_DAT2 in the memory 130. Accordingly, even when the valid image signal RGB is not received during the masking enable frame MEF, stress for the pixels PX (see FIG. 5) of the second display area DA2 may be accumulated.

First stress data corresponding to the first display area DA1 and the accumulated second stress data ASTR_DAT2 corresponding to the second display area DA2 among the stress data STR_DAT stored in the memory 130 may be provided to the compensation unit 110 as the previous stress data PSTR_DAT for an entire frame during a frame (e.g., the first frame F1 after the 120th frame F120) in which the next valid image signal RGB for the second display area DA2 is received.

Figure 12:
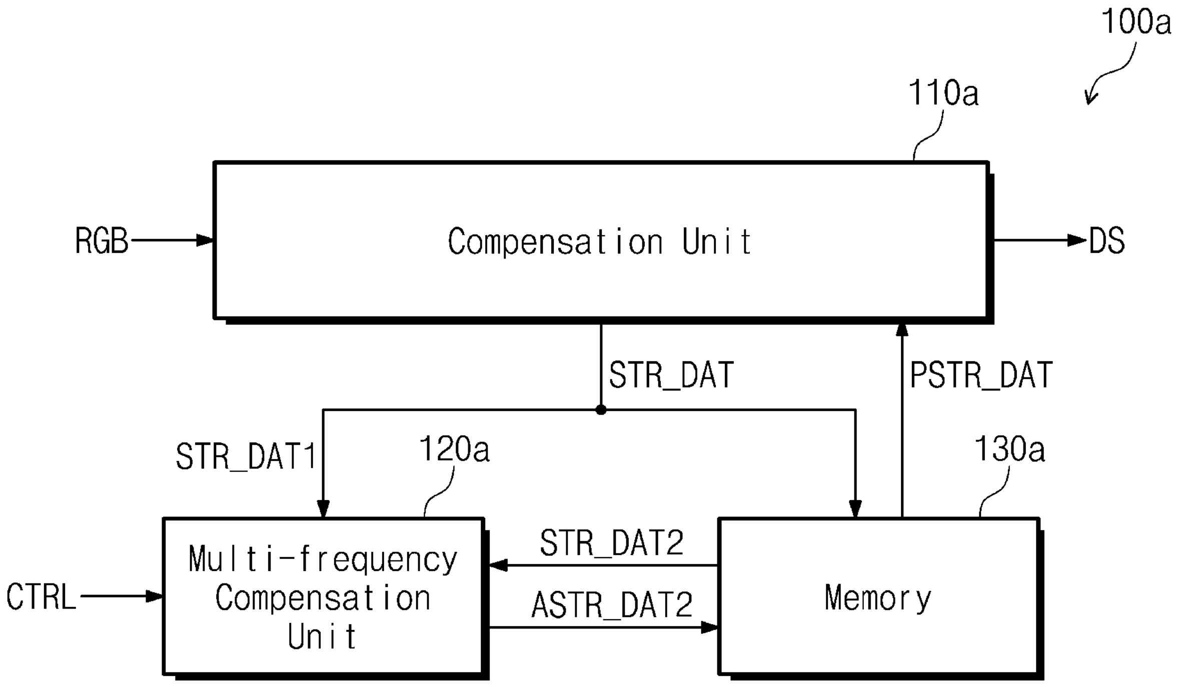
FIG. 12 is a block diagram of a driving controller according to an alternative embodiment of the disclosure.

FIG. 12 is a block diagram of a driving controller 100*a*, according to an alternative embodiment of the disclosure.

Referring to FIG. 12, in an alternative embodiment, a driving controller 100*a* includes a compensation unit 110*a*, a multi-frequency compensation unit 120*a*, and a memory 130*a*.

Among operating characteristics of the compensation unit 110*a*, the multi-frequency compensation unit 120*a*, and the memory 130*a* shown in FIG. 12, any repetitive detailed descriptions of the same or like characteristics as those of the compensation unit 110, the multi-frequency compensation unit 120, and the memory 130 shown in FIG. 8 will be omitted.

Referring to FIGS. 11A, 11B, and 12, when the operating mode is a multi-frequency mode and the current frame is the masking enable frame MEF, the multi-frequency compensation unit 120*a* counts the number of consecutive masking enable frames.

When the current frame is the masking enable frame MEF, the multi-frequency compensation unit 120*a* receives first stress data STR_DAT1 corresponding to the first display area DA1 from the compensation unit 110*a*, and receives the second stress data STR_DAT2 corresponding to the second display area DA2 (see FIG. 1) among the previous stress data PSTR_DAT stored in the memory 130*a*.

The multi-frequency compensation unit 120*a* calculates merged stress data MSTR_DAT based on the first stress data STR_DAT1, the second stress data STR_DAT2, and the number of consecutive masking enable frames MEF. The merged stress data MSTR_DAT may be stored in the memory 130.

Figure 13:
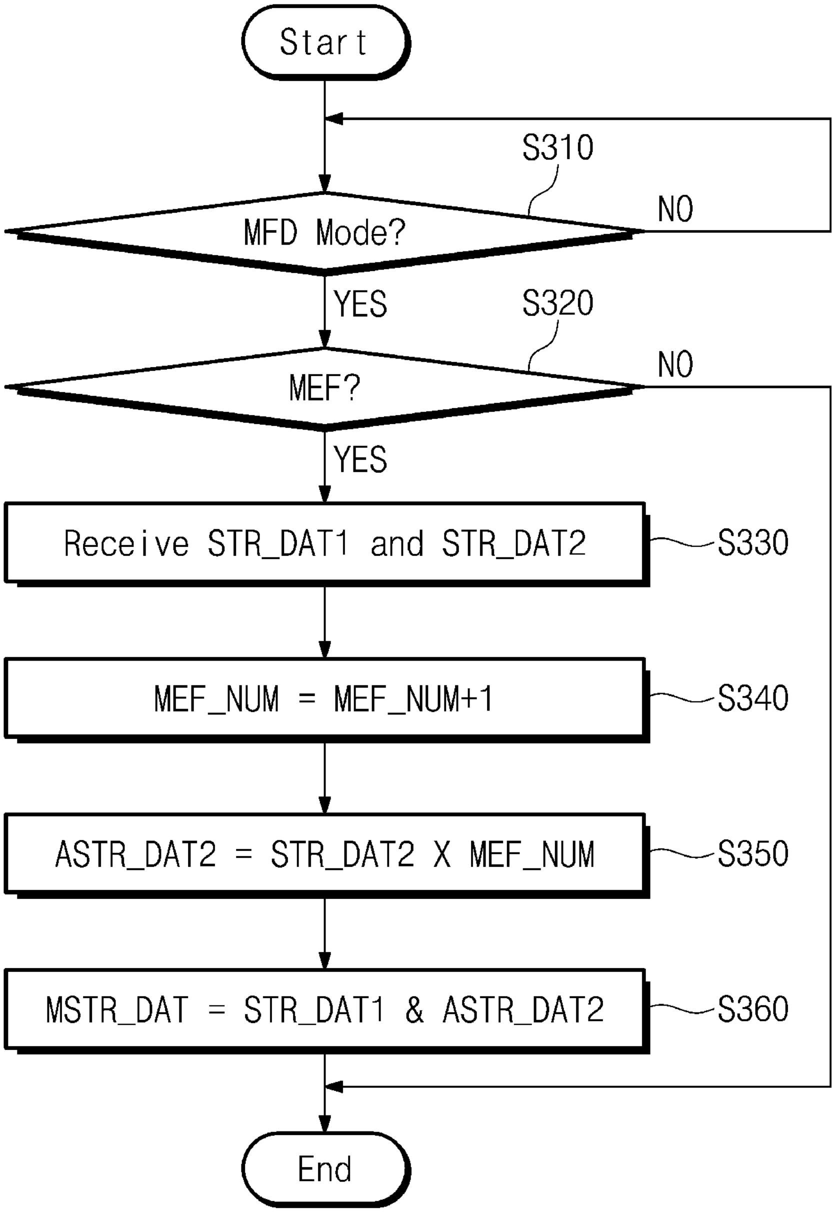
FIG. 13 is a flowchart for describing an operation of a driving controller shown in FIG. 12.

FIG. 13 is a flowchart for describing an operation of the driving controller 100*a* shown in FIG. 12.

Referring to FIGS. 12 and 13, when an operating mode is the normal mode NFD (case I), and when an operating mode is the multi-frequency mode MFD and a current frame is the full driving frame FDF (case II), an operation of the driving controller 100*a* is the same as that of the driving controller 100 described with reference to FIGS. 8, 9, and 11A, and thus, any repetitive detailed description thereof will be omitted.

In such an embodiment, when the operating mode is the multi-frequency mode MFD and the current frame is the masking enable frame MEF (case III), the operation of the driving controller 100 in the display device DD is as follows.

Referring to FIGS. 11B, 12, and 13, when the operating mode is the multi-frequency mode MFD (operation S310), the multi-frequency compensation unit 120*a* determines whether the current frame is the masking enable frame MEF (operation S320).

The multi-frequency compensation unit 120*a* may count the number of times that the data enable signal DE transitions to an active level, and may determine whether the current frame is the masking enable frame MEF, based on the count signal DE_CNT. When the count signal DE_CNT is less than the maximum value (e.g., 2640), the multi-frequency compensation unit 120*a* may determine the current frame as the masking enable frame MEF.

In an embodiment, as shown in FIG. 11B, each of the second to 120th frames F2 to F120 is the masking enable frame MEF. During the masking enable frame MEF, the image signal RGB provided from the outside to the compensation unit 110*a* includes only the image signal corresponding to the first display area DA1. Accordingly, the compensation unit 110*a* may calculate only the first stress data STR_DAT1 corresponding to the first display area DA1.

When the current frame is the masking enable frame MEF, the multi-frequency compensation unit 120*a* receives the first stress data STR_DAT1 corresponding to the first display area DA1 from the compensation unit 110*a*, and receives the second stress data STR_DAT2 corresponding to the second display area DA2 among the stress data STR_DAT stored in the memory 130*a* (operation S330).

When the current frame is the masking enable frame MEF, the multi-frequency compensation unit 120*a* counts the number MEF_NUM of consecutive masking enable frames MEF. For example, in the second frame F2, the number MEF_NUM of consecutive masking enable frame MEF is 1. In the 120th frame F120, the number MEF_NUM of consecutive masking enable frame MEF is 119.

The multi-frequency compensation unit 120*a* calculates the accumulated second stress data ASTR_DAT2 by multiplying the second stress data STR_DAT2 from the memory 130 and the number MEF_NUM of consecutive masking enable frames MEF (operation S350).

The multi-frequency compensation unit 120*a* outputs the merged stress data MSTR_DAT of one frame by combining the first stress data STR_DAT1 and the accumulated second stress data ASTR_DAT2. The stress data MSTR_DAT may be stored in the memory 130*a*.

Even when the valid image signal RGB corresponding to the second display area DA2 is not received during the second to 120th frames F2 to F120, an image corresponding to the first frame F1 is displayed on the display panel DP. When the operating mode is the multi-frequency mode MFD and the current frame is the masking enable frame MEF, the multi-frequency compensation unit 120*a* calculates the accumulated second stress data ASTR_DAT2 as much as the number of consecutive masking enable frames MEF and may stores the accumulated second stress data ASTR_DAT2 in the memory 130*a*. Accordingly, even when the valid image signal RGB is not received during the masking enable frame MEF, stress for the pixels PX (see FIG. 5) of the second display area DA2 may be accumulated.

In an embodiment, the multi-frequency compensation unit 120*a* may store the merged stress data MSTR_DAT of one frame during each masking enable frame MEF in the memory 130*a*.

The stress data MSTR_DAT stored in the memory 130*a* may be provided to the compensation unit 110*a* as the previous stress data PSTR_DAT in the next frame.

An embodiment of the display device DD shown in FIG. 1 is described above as an example, but the disclosure is not limited thereto. In an alternative embodiment, for example, as shown in FIG. 3, when the first display area DA11 and the second display area DA12 are separated by a same horizontal line, the multi-frequency compensation unit 120 shown in FIG. 3 and the multi-frequency compensation unit 120*a* shown in FIG. 12 may identify the masking enable frame MEF based on a pixel clock signal. The pixel clock signal is a signal included in the control signal CTRL. When the valid image signal RGB corresponding to each of the pixels PX in one horizontal line is received, the pixel clock signal transitions to the active level.

In an embodiment, for example, the number of pixels PX in one horizontal line may be 1080. In such an embodiment, the first display area DA11 may include 540 pixels in one horizontal line. In such an embodiment, the second display area DA12 may include 540 pixels in one horizontal line.

In such an embodiment, the first display area DA11 is driven at a first operating frequency (e.g., 120 Hz) and the second display area DA12 is driven at a second operating frequency (e.g., 1 Hz).

When the pixel clock signal is counted in a multi-frequency mode, the count signal increases up to 540, which is equal to the number of pixels PX of the first display area DA11.

Accordingly, the multi-frequency compensation unit 120 shown in FIG. 3 and the multi-frequency compensation unit 120*a* shown in FIG. 12 may determine the masking enable frame MEF based on the pixel clock signal.

Operations of the multi-frequency compensation unit 120 shown in FIG. 3 and the multi-frequency compensation unit 120*a* shown in FIG. 12 in the masking enable frame MEF of the multi-frequency mode MFD may be the same as those described with reference to FIGS. 8 to 13.

An embodiment of a display device according to the invention may operate in a multi-frequency mode in which a first display area is driven at a first operating frequency and a second display area is driven at a second operating frequency lower than the first operating frequency. As the operating frequency of the second display area decreases, power consumption of the display device may be reduced.

In such an embodiment, the display device may calculate accumulated second stress data for an image signal corresponding to a second display area in multi-frequency mode and may output combined stress data obtained by combining first stress data corresponding to a first display area and the accumulated second stress data corresponding to the second display area.

The display device may perform a stress compensation operation based on the combined stress data, thereby compensating for a change in characteristics of the pixels. Accordingly, the image display quality of the display device may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a first display area and a second display area; and a driving controller configured to:

receive an image signal and a control signal;

output an image data signal corresponding to an image to be displayed by the display panel; and when the control signal indicates a multi-frequency mode, drive the first display area at a first operating frequency and drive the second display area at a second operating frequency different from the first operating frequency, wherein the multi-frequency mode includes full driving frames and masking enable frames, wherein the driving controller includes:

a compensation unit configured to calculate stress data based on the image signal and previous stress data, and to output the image data signal, which is obtained by compensating for the image signal based on the stress data;

a memory configured to store the stress data of a previous frame from the compensation unit as the previous stress data and to provide the previous stress data to the compensation unit; and a multi-frequency compensation unit configured to:

count a number of consecutive masking enable frames in the multi-frequency mode;

calculate accumulated second stress data based on the number of the consecutive masking enable frames and second stress data, wherein the second stress data corresponds to the second display area, from among the previous stress data from the memory; and store the accumulated second stress data in the memory.

2. The display device of claim 1, wherein first stress data corresponding to the first display area and the accumulated second stress data corresponding to the second display area among the stress data previously stored in the memory are provided to the compensation unit as the previous stress data.

3. The display device of claim 1, wherein the accumulated second stress data is obtained by multiplying the second stress data and the number of the consecutive masking enable frames.

4. The display device of claim 1, wherein the control signal includes a data enable signal, and wherein the multi-frequency compensation unit determines whether a current frame corresponds to one of the full driving frames and the masking enable frames, based on a count signal obtained by counting a number of times that the data enable signal transitions to an active level during the current frame.

5. The display device of claim 4, wherein, when the count signal is less than a reference value, the multi-frequency compensation unit determines that the current frame is one of the masking enable frames.

6. The display device of claim 5, wherein the reference value is equal to a number of all horizontal lines of the display panel, and wherein the data enable signal transitions to an active level when a valid image signal corresponding to a respective horizontal line is received.

7. The display device of claim 1, wherein the second operating frequency is a frequency lower than the first operating frequency.

8. The display device of claim 1, wherein, in the multi-frequency mode, the multi-frequency compensation unit is configured to:

count the number of the consecutive masking enable frames;

receive first stress data corresponding to the first display area and second stress data corresponding to the second display area from the memory among the stress data from the compensation unit;

calculate the accumulated second stress data based on the number of the consecutive masking enable frames; and store merged stress data, which is obtained by merging the first stress data and the accumulated second stress data, in the memory.

9. The display device of claim 8, wherein the merged stress data stored in the memory is provided to the compensation unit as the previous stress data during a next frame.

10. A driving controller comprising:

a compensation unit configured to receive an image signal corresponding to a first display area and a second display area, to calculate stress data based on the image signal and previous stress data, and to output an image data signal, which is obtained by compensating for the image signal based on the stress data;

a memory configured to store the stress data of a previous frame from the compensation unit as the previous stress data and to provide the previous stress data to the compensation unit; and a multi-frequency compensation unit configured to:

receive a data enable signal;

when the data enable signal indicates a multi-frequency mode, count a number of consecutive masking enable frames;

calculate accumulated second stress data based on the number of the consecutive masking enable frames and second stress data, which corresponds to the second display area, from among the stress data from the memory; and store the accumulated second stress data in the memory, wherein the multi-frequency mode includes full driving frames and masking enable frames, wherein the multi-frequency compensation unit determines whether a current frame corresponds to one of the full driving frames and the masking enable frames, based on the data enable signal, wherein, in the multi-frequency mode, the first display area is driven at a first operating frequency, and the second display area is driven at a second operating frequency different from the first operating frequency.

11. The driving controller of claim 10, wherein first stress data corresponding to the first display area and the accumulated second stress data corresponding to the second display area among the stress data previously stored in the memory are provided to the compensation unit as the previous stress data.

12. The driving controller of claim 10, wherein the accumulated second stress data is obtained by multiplying the second stress data and the number of the consecutive masking enable frames.

13. The driving controller of claim 10, wherein the multi-frequency compensation unit determines whether the current frame corresponds to one of the full driving frames and the masking enable frames, based on a count signal obtained by counting a number of times that the data enable signal transitions to an active level during the current frame.

14. The driving controller of claim 13, wherein, when the count signal is less than a reference value, the multi-frequency compensation unit determines that the current frame is one of the masking enable frames.

15. The driving controller of claim 10, wherein the second operating frequency is a frequency lower than the first operating frequency.

16. The driving controller of claim 10, wherein, in the multi-frequency mode, the multi-frequency compensation unit configured to:

count the number of the consecutive masking enable frames;

receive first stress data corresponding to the first display area and second stress data corresponding to the second display area from the memory among the stress data from the compensation unit;

calculate the accumulated second stress data based on the number of the consecutive masking enable frames; and store merged stress data, which is obtained by merging the first stress data and the accumulated second stress data, in the memory.

17. The driving controller of claim 16, wherein the merged stress data stored in the memory is provided to the compensation unit as the previous stress data during a next frame.

18. A driving method of a display device, the method comprising:

receiving an image signal corresponding to a first display area and a second display area and receiving previous stress data from a memory;

calculating stress data based on the image signal and the previous stress data and compensating for the image signal based on the stress data;

outputting an image data signal obtained by compensating for the image signal based on the stress data, and storing the stress data in the memory;

receiving a control signal and determining whether a current frame is a masking enable frame of a multi-frequency mode, based on the control signal;

when the current frame is the masking enable frame of the multi-frequency mode, counting a number of consecutive masking enable frames; and calculating accumulated second stress data based on the number of the consecutive masking enable frames and second stress data corresponding to the second display area among the stress data stored in the memory and storing the accumulated second stress data in the memory.

19. The method of claim 18, wherein the receiving the previous stress data from the memory includes:

receiving first stress data corresponding to the first display area and the accumulated second stress data corresponding to the second display area among the stress data previously stored in the memory as the previous stress data.

20. The method of claim 18, wherein the accumulated second stress data is obtained by multiplying the second stress data and the number of the consecutive masking enable frames.

* * * * *